「(12) United States Patent
Sato et al.

(10) Patent No.: US 6,879,727 B2
(45) Date of Patent: Apr. 12, 2005

(54) DECODING BIT-PLANE-ENCODED DATA USING DIFFERENT IMAGE QUALITY FOR DISPLAY

(75) Inventors: Makoto Sato, Tokyo (JP); Hiroshi Kajiwara, Tokyo (JP); Hiroki Kishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 09/818,560

(22) Filed: Mar. 28, 2001

(65) Prior Publication Data

US 2001/0028748 A1 Oct. 11, 2001

(30) Foreign Application Priority Data

Mar. 30, 2000 (JP) ........................................ 2000-095346
Jan. 29, 2001 (JP) ........................................ 2001-020685

(51) Int. Cl.[7] ............................................... G06K 9/36
(52) U.S. Cl. ...................................... 382/239; 382/240
(58) Field of Search ................................ 382/232, 233, 382/239, 240, 243, 248, 282, 283, 299, 284; 345/636, 629, 634; 375/240.19

(56) References Cited

U.S. PATENT DOCUMENTS

| 5,402,248 A | 3/1995 | Sato et al. ................... 358/426 |
| 5,812,146 A | 9/1998 | Sato et al. ................... 345/501 |
| 5,861,892 A | 1/1999 | Sato et al. ................... 345/435 |
| 5,945,930 A | 8/1999 | Kajiwara ...................... 341/50 |
| 5,978,514 A * | 11/1999 | Yamaguchi et al. ........ 382/243 |
| 6,028,963 A | 2/2000 | Kajiwara ..................... 382/239 |
| 6,031,938 A | 2/2000 | Kajiwara ..................... 382/239 |
| 6,041,143 A * | 3/2000 | Chui et al. ................... 382/232 |
| 6,101,282 A | 8/2000 | Hirabayashi et al. ....... 382/246 |
| 6,233,355 B1 | 5/2001 | Kajiwara ..................... 382/238 |
| 2001/0002851 A1 * | 6/2001 | Shimada et al. ......... 348/423.1 |

* cited by examiner

*Primary Examiner*—Von J. Couso
(74) *Attorney, Agent, or Firm*—Fitzpatrick, Cella, Harper & Scinto

(57) ABSTRACT

An image processing apparatus includes an encoding section and a decoding section. The encoding section includes means for encoding an input image to generate encoded data, means for receiving a designation of an image quality for display of the input image, and means for outputting, of the encoded data, encoded data necessary to display the input image at an image quality equal to or higher than the designated image quality. The decoding section includes means for decoding the encoded data output from the encoding section to generate image data, and means for, when an image based on the image data has an image quality higher than the designated image quality, converting the image data into image data having the designated image quality.

17 Claims, 17 Drawing Sheets

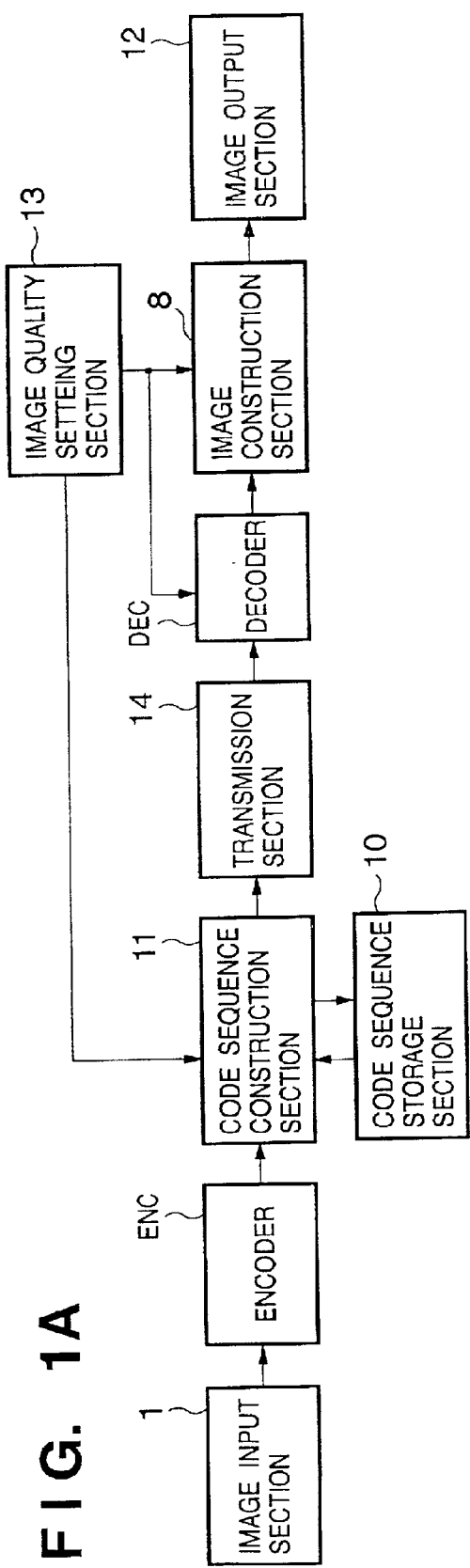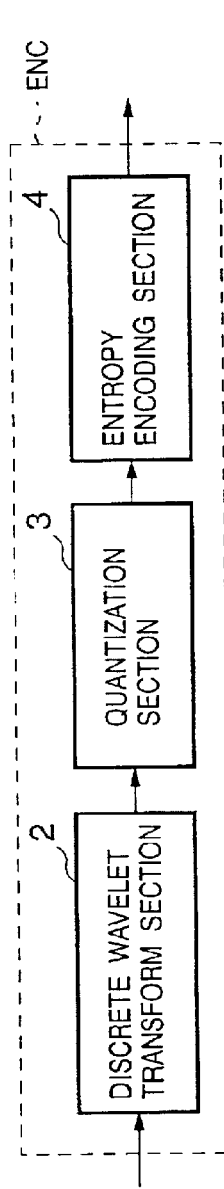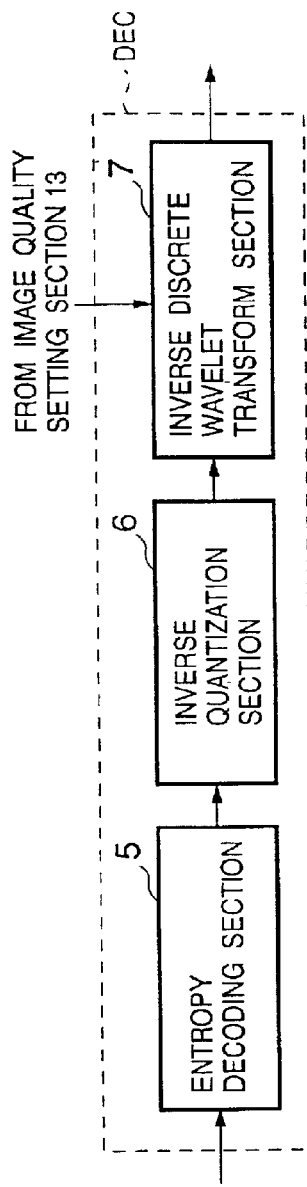

FIG. 3A | MH | TH0 | BS0 | TH1 | BS1 | ... | THn-1 | BSn-1 |

FIG. 3B | IMAGE SIZE | TILE SIZE | NUMBER OF COMPONENTS | COMPONENT INFORMATION |

FIG. 3C | TILE LENGTH | ENCODING PARAMETER |

FIG. 3D | LL | HL2 | LH2 | HH2 | HL1 | LH1 | HH1 | → | Layer L-1 | Layer L-2 | ... | Layer 0 |

FIG. 3E | PH | CB0_L-1 | CB1_L-1 | CB2_L-1 | CB3_L-1 | → | CODE BLOCK DESIGNATION | NUMBER OF PLANES OF EACH CODE BLOCK | DIFFERENCE BETWEEN S AND EACH SB |

FIG. 5A

| MH | TH0 | BS0 | TH1 | BS1 | ... | THn-1 | BSn-1 |

FIG. 5B

| IMAGE SIZE | TILE SIZE | NUMBER OF COMPONENTS | COMPONENT INFORMATION |

FIG. 5C

| TILE LENGTH | ENCODING PARAMETER |

FIG. 5D

| Layer L-1 | Layer L-2 | ... | Layer 0 |

| LL | HL2 | LH2 | HH2 | HL1 | LH1 | HH1 |

FIG. 5E

| PH | CB0_L-1 | CB1_L-1 | CB2_L-1 | CB3_L-1 |

| CODE BLOCK DESIGNATION | NUMBER OF PLANES OF EACH CODE BLOCK | DIFFERENCE BETWEEN S AND EACH SB |

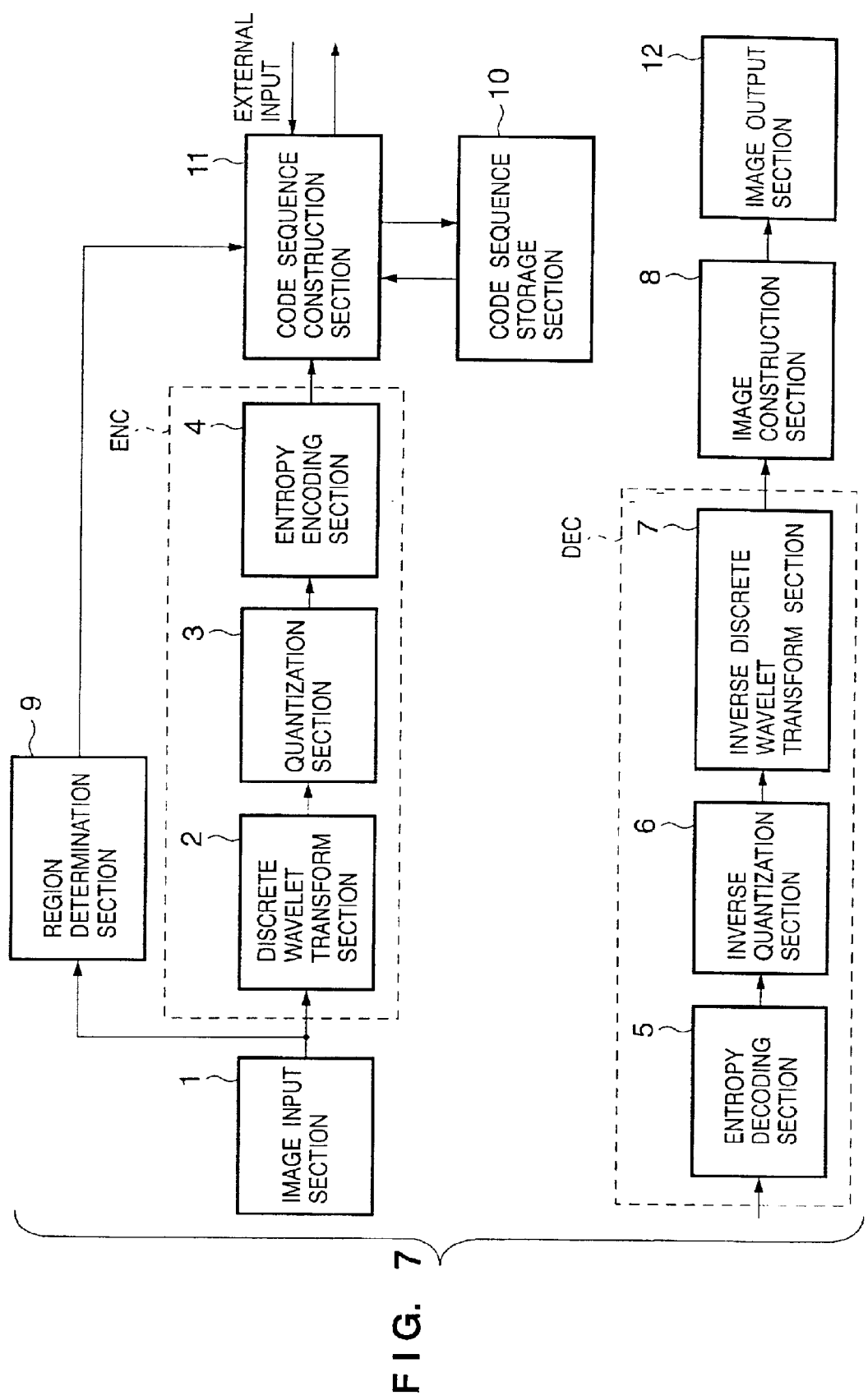
F I G. 7

DECODING BIT-PLANE-ENCODED DATA USING DIFFERENT IMAGE QUALITY FOR DISPLAY

FIELD OF THE INVENTION

The present invention relates to a field of image processing and, more particularly, to image encoding and decoding.

BACKGROUND OF THE INVENTION

Along with recent remarkable progress in computers and networks, various kinds of information such as character data, image data, and audio data are stored and transmitted in computers or between networks. Of these data, an image and especially a multilevel image contains a very large quantity of information. In storing/transmitting the image, the enormous amount of data poses a problem.

Hence, for an application purpose such as an image database which allows image browsing through a network, images in the device for storing them are often compression-coded. To browse these images, all the compression-coded data must be transmitted and decoded. If the band of the network is insufficient, it takes a long time to display the image.

In such a case, only part of the compression-coded data is transmitted to display the image at a resolution lower than the original resolution. For, e.g., JPEG that is a compression-coding scheme recommended by the ISO and ITU-T, a hierarchical encoding scheme is defined whereby an image can be decoded at a resolution lower than the original resolution by a factor of a power of 2.

In JPEG, however, the encoding processing is complex, a reduced image or thumbnail image must be generated and encoded, and, for each layer of resolution necessary for decoding, the difference between a result obtained by decoding the reduced image and an image obtained by reducing the original image to that resolution must be encoded.

An encoding scheme that has recently received a great deal of attention is a scheme using discrete wavelet transformation. FIG. 17A is a block diagram showing the basic arrangement of a compression-coding/decoding apparatus based on discrete wavelet transformation. Referring to FIG. 17A, an image input section 1 outputs an image signal to be compression-coded, and transformation is performed by a discrete wavelet transform section 2 on the output side. The discrete wavelet transform section 2 executes 2-dimensional discrete wavelet transformation for the image signal and outputs transform coefficients. The transform coefficients are put together in units of predetermined frequency bands (to be referred to as subbands hereinafter), and quantized and converted into quantization indices by a quantization section 3 on the output side. The quantization indices are encoded by an entropy encoding section 4, so a code sequence is output.

FIG. 17D is a block diagram showing the arrangement of a decoding apparatus for decoding the thus generated code sequence. Referring to FIG. 17D, quantization indices decoded by an entropy decoding section 5 are reconstructed to transform coefficients by an inverse quantization section 6 on the output side. The reconstructed transform coefficients are inversely transformed by an inverse discrete wavelet transform section 7, so the image signal is reconstructed and output from an image output section 8.

FIG. 17B is a view showing the structure of subbands generated by the discrete wavelet transform section 2. Referring to FIG. 17B, a subband LL is the subband with the lowest frequency and can also be regarded as an image signal whose resolution is lowered by passing the original image through a low-pass filter and subsampling the image signal. Hence, when only the subband LL is decoded without decoding all subbands in decoding the image signal, and the decoded signal is normalized into the dynamic range of the original image signal, an image reduced to ¼ the original image in both the vertical and horizontal directions can be obtained.

When an image with a resolution higher by one level is necessary, subbands lower by one level, i.e., subbands HL2, LH2, and HH2 are decoded and inversely transformed together with the subband LL, as shown in FIG. 17C. An image whose resolution is lowered to ½ in both the vertical and horizontal directions is obtained, as shown in FIG. 17C.

As described above, in the encoding scheme using discrete wavelet transformation, a reduced image can be generated from a code sequence using the subband structure by transformation.

However, as described above, in the method using the subband structure of discrete wavelet transformation, the quality of the generated reduced image is not always sufficiently high. Especially, when the image contains information such as characters or graphic patterns, such patterns cannot be discriminated in some cases because an image without any high-frequency component is obtained by the above method.

SUMMARY OF THE INVENTION

It is a main object of the present invention to provide an image processing technique capable of maintaining the quality of an entire image or a necessary portion in encoding/decoding the image in providing a reduced image.

According to the present invention, there is provided an image processing apparatus comprising:

encoding means for executing predetermined sequence transformation for an input image and bit-plane-encoding an obtained transform coefficient;

storing means for storing encoded data obtained by the encoding means;

recognition means for recognizing a first image quality of the image to be displayed by a predetermined display device;

output means for reading out, from the storing means, data necessary to reconstruct an image having a predetermined image quality in the encoded data and outputting the data;

decoding means for decoding the output encoded data; and adjustment means for adjusting the image decoded by the decoding means to make an image quality of the image match the first image quality, wherein the recognition means instructs the output means to read out encoded data corresponding to a decoded image having a second image quality in the held encoded data on the basis of a predetermine condition, and the adjustment means adjusts the image obtained by decoding, by the decoding means, the encoded data output by the output means, to make an image quality of the image to be displayed by the display device match the first image quality.

According to the present invention, there is also provided an image processing method comprising:

the encoding step of executing predetermined sequence transformation for an input image and bit-plane-encoding an obtained transform coefficient;

the step of storing encoded data obtained in the encoding step in storage means;

the recognition step of recognizing a first image quality of the image to be displayed by a predetermined display device;

the output step of reading out, from the storage means, data necessary to reconstruct an image having a predetermined image quality in the encoded data and outputting the data;

the decoding step of decoding the output encoded data; and the adjustment step of adjusting the image decoded in the decoding step to make an image quality of the image match the first image quality, wherein the output step comprises the step of reading out encoded data corresponding to a decoded image having a second image quality in the held encoded data on the basis of a predetermine condition, and the adjustment step comprises the step of adjusting the image obtained by decoding, in the decoding step, the encoded data output in the output step, to make an image quality of the image to be displayed by the display device match the first image quality.

According to the present invention, there is also provided a program wherein the program causes a computer to function as encoding means for executing predetermined sequence transformation for an input image and bit-plane-encoding an obtained transform coefficient;

storing means for storing encoded data obtained by the encoding means;

recognition means for recognizing a first image quality of the image to be displayed by a predetermined display device;

output means for reading out, from the storing means, data necessary to reconstruct an image having a predetermined image quality in the encoded data and outputting the data;

decoding means for decoding the output encoded data; and adjustment means for adjusting the image decoded by the decoding means to make an image quality of the image match the first image quality, wherein the recognition means instructs the output means to read out encoded data corresponding to a decoded image having a second image quality in the held encoded data on the basis of a predetermine condition, and the adjustment means adjusts the image obtained by decoding, by the decoding means, the encoded data output by the output means, to make an image quality of the image to be displayed by the display device match the first image quality.

According to the present invention, there is also provided an image processing apparatus comprising an encoding section and a decoding section, the encoding section comprising means for encoding an input image to generate encoded data, means for receiving a designation of an image quality for display of the input image, and means for outputting, of the encoded data, encoded data necessary to display the input image at an image quality equal to or higher than the designated image quality, and the decoding section comprising means for decoding the encoded data output from the encoding section to generate image data, and means for, when an image based on the image data has an image quality higher than the designated image quality, converting the image data into image data having the designated image quality.

According to the present invention, there is also provided an image processing apparatus comprising:

means for encoding an image to generate encoded data;

means for receiving a designation of an image quality for display of the image; and means for outputting, of the encoded data, encoded data necessary to display the image at an image quality equal to or higher than the designated image quality.

According to the present invention, there is also provided an image processing apparatus for decoding encoded data output from an encoding device for encoding an image, comprising:

means for designating an image quality of the image for the encoding device;

means for decoding the encoded data output from the encoding device to generate image data; and means for, when an image based on the image data has an image quality higher than the designated image quality, converting the image data into image data having the designated image quality.

According to the present invention, there is also provided an image processing method comprising the encoding step and the decoding step, the encoding step comprising the steps of encoding an input image to generate encoded data, receiving a designation of an image quality for display of the input image, and outputting, of the encoded data, encoded data necessary to display the input image at an image quality equal to or higher than the designated image quality, and the decoding step comprising the steps of decoding the encoded data output from an encoding section to generate image data, and when an image based on the image data has an image quality higher than the designated image quality, converting the image data into image data having the designated image quality.

According to the present invention, there is also provided an image processing method comprising the steps of:

encoding an image to generate encoded data;

receiving a designation of an image quality for display of the image; and outputting, of the encoded data, encoded data necessary to display the image at an image quality equal to or higher than the designated image quality.

According to the present invention, there is also provided an image processing method of decoding encoded data output from an encoding device for encoding an image, comprising the steps of:

designating an image quality of the image for the encoding device;

decoding the encoded data output from the encoding device to generate image data; and when an image based on the image data has an image quality higher than the designated image quality, converting the image data into image data having the designated image quality.

According to the present invention, there is also provided a program wherein the program causes a computer to function as an encoding section and a decoding section, the encoding section comprising means for encoding an input image to generate encoded data, means for receiving a designation of an image quality for display of the input image, and means for outputting, of the encoded data, encoded data necessary to display the input image at an image quality equal to or higher than the designated image quality, and the decoding section comprising means for decoding the encoded data output from the encoding section to generate image data, and means for, when an image based on the image data has an image quality higher than the designated image quality, converting the image data into image data having the designated image quality.

According to the present invention, there is also provided a program which causes a computer to function as:

means for encoding an image to generate encoded data;

means for receiving a designation of an image quality for display of the image; and means for outputting, of the encoded data, encoded data necessary to display the image at an image quality equal to or higher than the designated image quality.

According to the present invention, there is also provided a program which, to decode encoded data output from an encoding device for encoding an image, causes a computer to function as:

means for designating an image quality of the image for the encoding device;

means for decoding the encoded data output from the encoding device to generate image data; and means for, when an image based on the image data has an image quality higher than the designated image quality, converting the image data into image data having the designated image quality.

According to the present invention, there is also provided an image processing apparatus for encoding an image and outputting encoded data, comprising:

determination means for determining a type of the image;

encoding means for executing encoding including discrete wavelet transformation for the image to generate the encoded data of the image;

means for receiving an input of a resolution of a decoded image, which is to be used upon decoding the encoded data; and output means for outputting, of the generated encoded data, data necessary to generate the decoded image having the input resolution, wherein for a specific type of image, the output means outputs, of the encoded data, data necessary to generate the decoded image having a resolution higher than the input resolution.

According to the present invention, there is also provided an image processing apparatus for encoding an image and outputting encoded data, comprising:

means for segmenting the image into a plurality of regions of a predetermined unit;

determination means for determining a type of each of the segmented images;

encoding means for executing encoding including discrete wavelet transformation for each of the segmented images to generate the encoded data of each of the images;

means for receiving an input of a resolution of a decoded image, which is to be used upon decoding the encoded data; and output means for outputting, of the generated encoded data, data necessary to generate the decoded image having the input resolution, wherein for the region corresponding to a specific type of image, the output means outputs, of the encoded data, data necessary to generate the decoded image having a resolution higher than the input resolution. In addition, there is provided an image processing apparatus for decoding the encoded data output by this image processing apparatus, wherein for the region corresponding to the specific type of image, the decoded image is formed at a resolution higher than that of the remaining regions.

According to the present invention, there is also provided an image processing apparatus for encoding an image and outputting encoded data, comprising:

first encoding means for segmenting the image into a plurality of subbands by discrete wavelet transformation;

means for segmenting an image of each subband into regions of a predetermined unit;

determination means for determining a type of the image of each region;

second encoding means for executing quantization and entropy encoding for the image of each region to generate encoded data of each region;

means for receiving an input of a resolution of a decoded image, which is to be used upon decoding the encoded data; and output means for outputting, of the generated encoded data, data necessary to generate the decoded image having the input resolution, wherein for a specific type of image, the output means outputs, of the encoded data, data necessary to generate the decoded image having a resolution higher than the input resolution. In addition, there is provided an image processing apparatus for decoding the encoded data output by this image processing apparatus, wherein for the region corresponding to the specific type of image, the decoded image is formed at a resolution higher than that of the remaining regions.

According to the present invention, there is also provided an image processing apparatus for encoding an image and outputting encoded data, comprising:

means for segmenting the image into a plurality of regions of a predetermined unit;

determination means for determining a type of each of the segmented images;

encoding means for executing encoding including discrete wavelet transformation for each of the segmented images to generate the encoded data of each of the images;

means for receiving an input of a resolution of a decoded image, which is to be used upon decoding the encoded data; and output means for outputting, of the generated encoded data, data necessary to generate the decoded image having the input resolution, wherein for the region corresponding to a specific type of image, the output means additionally outputs, of the encoded data, data necessary to generate the decoded image having a resolution higher than the input resolution.

According to the present invention, there is also provided an image processing method of encoding an image and outputting encoded data, comprising:

the determination step of determining a type of the image;

the encoding step of executing encoding including discrete wavelet transformation for the image to generate the encoded data of the image;

the step of receiving an input of a resolution of a decoded image, which is to be used upon decoding the encoded data; and the output step of outputting, of the generated encoded data, data necessary to generate the decoded image having the input resolution, wherein the output step comprises the step of, for a specific type of image, outputting, of the encoded data, data necessary to generate the decoded image having a resolution higher than the input resolution.

According to the present invention, there is also provided an image processing method of encoding an image and outputting encoded data, comprising:

the step of segmenting the image into a plurality of regions of a predetermined unit;

the determination step of determining a type of each of the segmented images;

the encoding step of executing encoding including discrete wavelet transformation for each of the segmented images to generate the encoded data of each of the images;

the step of receiving an input of a resolution of a decoded image, which is to be used upon decoding the encoded data; and the output step of outputting, of the generated encoded data, data necessary to generate the decoded image having the input resolution, wherein the output step comprises the step of, for the region corresponding to a specific type of image, outputting, of the encoded data, data necessary to generate the decoded image having a resolution higher than the input resolution. In addition, there is provided an image processing method of decoding the encoded data output by this image processing method, wherein for the region corresponding to the specific type of image, the decoded image is formed at a resolution higher than that of the remaining regions.

According to the present invention, there is also provided an image processing method of encoding an image and outputting encoded data, comprising:

the first encoding step of segmenting the image into a plurality of subbands by discrete wavelet transformation;

the step of segmenting an image of each subband into regions of a predetermined unit;

the determination step of determining a type of the image of each region;

the second encoding step of executing quantization and entropy encoding for the image of each region to generate encoded data of each region;

the step of receiving an input of a resolution of a decoded image, which is to be used upon decoding the encoded data; and the output step of outputting, of the generated encoded data, data necessary to generate the decoded image having the input resolution, wherein the output step comprises, for a specific type of image, outputting, of the encoded data, data necessary to generate the decoded image having a resolution higher than the input resolution. In addition, there is provided an image processing method of decoding the encoded data output by this image processing method, wherein for the region corresponding to the specific type of image, the decoded image is formed at a resolution higher than that of the remaining regions.

According to the present invention, there is also provided an image processing method of encoding an image and outputting encoded data, comprising:

the step of segmenting the image into a plurality of regions of a predetermined unit;

the determination step of determining a type of each of the segmented images;

the encoding step of executing encoding including discrete wavelet transformation for each of the segmented images to generate the encoded data of each of the images;

the step of receiving an input of a resolution of a decoded image, which is to be used upon decoding the encoded data; and the output step of outputting, of the generated encoded data, data necessary to generate the decoded image having the input resolution, wherein the output step comprises the step of, for the region corresponding to a specific type of image, additionally outputting, of the encoded data, data necessary to generate the decoded image having a resolution higher than the input resolution.

According to the present invention, there is also provided a program wherein to encode an image to output encoded data, the program causes a computer to function as:

determination means for determining a type of the image;

encoding means for executing encoding including discrete wavelet transformation for the image to generate the encoded data of the image;

means for receiving an input of a resolution of a decoded image, which is to be used upon decoding the encoded data; and output means for outputting, of the generated encoded data, data necessary to generate the decoded image having the input resolution, wherein for a specific type of image, the output means outputs, of the encoded data, data necessary to generate the decoded image having a resolution higher than the input resolution.

According to the present invention, there is also provided a program wherein to encode an image to output encoded data, the program causes a computer to function as:

means for segmenting the image into a plurality of regions of a predetermined unit;

determination means for determining a type of each of the segmented images;

encoding means for executing encoding including discrete wavelet transformation for each of the segmented images to generate the encoded data of each of the images;

means for receiving an input of a resolution of a decoded image, which is to be used upon decoding the encoded data; and output means for outputting, of the generated encoded data, data necessary to generate the decoded image having the input resolution, wherein for the region corresponding to a specific type of image, the output means outputs, of the encoded data, data necessary to generate the decoded image having a resolution higher than the input resolution. In addition, there is provided a program wherein, to decode encoded data output by causing a computer to execute this program, the program causes the computer to function as:

means for, for the region corresponding to the specific type of image, forming the decoded image at a resolution higher than that of the remaining regions.

According to the present invention, there is also provided a program wherein to encode an image to output encoded data, the program causes a computer to function as:

first encoding means for segmenting the image into a plurality of subbands by discrete wavelet transformation;

means for segmenting an image of each subband into regions of a predetermined unit;

determination means for determining a type of the image of each region;

second encoding means for executing quantization and entropy encoding for the image of each region to generate encoded data of each region;

means for receiving an input of a resolution of a decoded image, which is to be used upon decoding the encoded data; and output means for outputting, of the generated encoded data, data necessary to generate the decoded image having the input resolution, wherein for a specific type of image, the output means outputs, of the encoded data, data necessary to generate the decoded image having a resolution higher than the input resolution. In addition, there is provided a program wherein to decode encoded data output by causing a computer to execute this program, the program causes the computer to function as:

means for, for the region corresponding to the specific type of image, forming the decoded image at a resolution higher than that of the remaining regions.

According to the present invention, there is also provided a program wherein to encode an image to output encoded data, the program causes a computer to function as:

means for segmenting the image into a plurality of regions of a predetermined unit;

determination means for determining a type of each of the segmented images;

encoding means for executing encoding including discrete wavelet transformation for each of the segmented images to generate the encoded data of each of the images;

means for receiving an input of a resolution of a decoded image, which is to be used upon decoding the encoded data; and output means for outputting, of the generated encoded data, data necessary to generate the decoded image having the input resolution, wherein for the region corresponding to a specific type of image, the output means additionally outputs, of the encoded data, data necessary to generate the decoded image having a resolution higher than the input resolution.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 1A to 1C are block diagrams of an image processing apparatus according to the first embodiment of the present invention;

FIGS. 3A to 3E are schematic views of a code sequence generated and output by the image processing apparatus shown in FIG. 1;

FIGS. 5A to 5E are views showing the structure of a code sequence by a code sequence construction section 11 according to the second embodiment of the present invention;

FIG. 7 is a block diagram of an image processing apparatus according to the fourth embodiment of the present invention;

DETAILED DESCRIPTION OF THE PREFERRED EMBODIMENTS

Figure 2A:
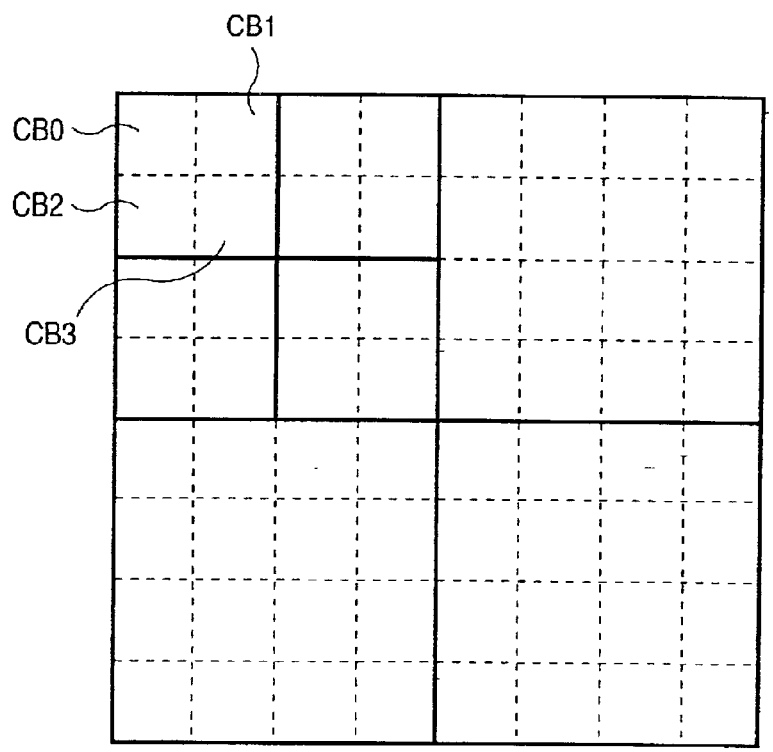
FIG. 2A is a view showing a subband segmented into code blocks CB.

Preferred Embodiments of the present invention will now be described in detail in accordance with the accompanying drawings.

<First Embodiment>

FIGS. 1A to 1C are block diagrams of an image processing apparatus according to an embodiment of the present invention. An outline of operation of the image processing apparatus will be described first with reference to FIGS. 1A to 1C.

Referring to FIGS. 1A to 1C, an image input from an image input section 1 is compression-coded by an image encoder ENC. The generated code sequence is output to a code sequence construction section 11 on the output side. The code sequence construction section 11 constructs the received code sequence by a predetermined method and outputs it to a code sequence storage section 10 or transmission section 14. The code sequence construction section 11 also has a function of changing the structure of a code sequence stored in the code sequence storage section 10 and storing or transmitting the code sequence.

The code sequence storage section 10 is a storage medium such as a memory or hard disk for storing a compression-coded image. The code sequence stored in the code sequence storage section 10 is transmitted to the decoding side through the transmission section 14, reconstructed into an image by an image decoder DEC, and displayed or output from an image output section 12 through an image construction section 8.

An image quality setting section 13 sets the quality of the image to be output from the image output section 12 on the basis of a user input or a predetermined input (not shown). In this embodiment, the image quality is defined as the resolution of an image displayed. Hence, information related to the resolution designated by the image quality setting section 13 is independently sent to the code sequence construction section 11, and the code sequence construction section 11 outputs a predetermined code sequence to the transmission section 14 on the basis of this information. Operation of each section of this image processing apparatus will be described below in detail.

The image input section 1 receives an image having a predetermined resolution from an input device (not shown) and outputs the image to the encoder ENC. The input image can be either a color image or a monochrome grayscale image. The encoding processing to be described later assumes that the input image is a monochrome grayscale image. However, even when the input image is a color image, the present invention can be applied by independently performing a series of processing operations for each color component of the color image.

Figure 9A:
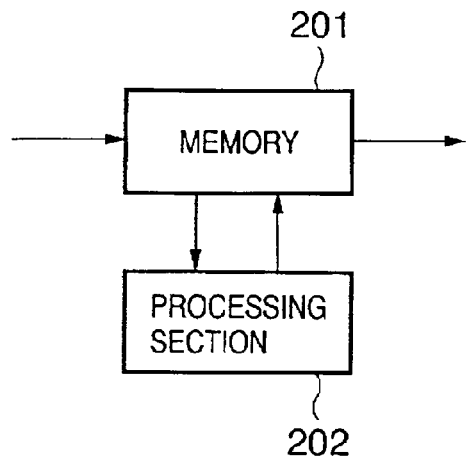
FIGS. 9A to 9C are explanatory views of a discrete wavelet transform section 2.

The input image is subjected to discrete wavelet transformation by a discrete wavelet transform section 2. The discrete wavelet transform section 2 executes two-dimensional discrete wavelet transform processing for the received image signal and calculates and outputs transform coefficients. FIG. 9A shows the basic arrangement of the discrete wavelet transform section 2. The received image signal is stored in a memory 201, sequentially read out and transformed by a processing section 202, and written in the memory 201 again.

Figure 9B:
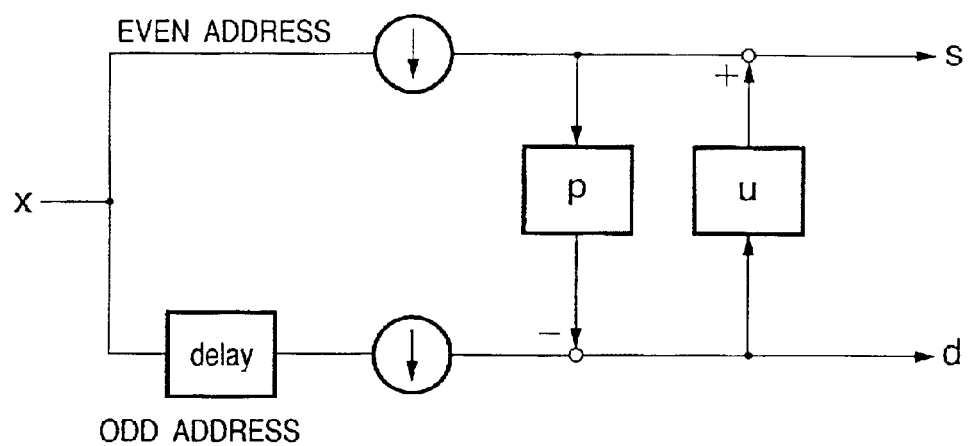

FIG. 9B shows the arrangement of the processing section 202. The input image signal is separated into even and odd address signals by a combination of a delay element and down sampler, and filter processing is executed by two filters p and u. Referring to FIG. 9B, s and d denote low- and high-pass coefficients in decomposing a one-dimensional image signal to one level and are given by $$d(n)=x(2*n+1)-\text{floor}((x(2*n)+x(2*n+2))/2) \tag{1}$$

$$s(n)=x(2*n)+\text{floor}((d(n-1)+d(n))/4) \tag{2}$$

where x(n) is the image signal to be transformed.

Figure 9C:
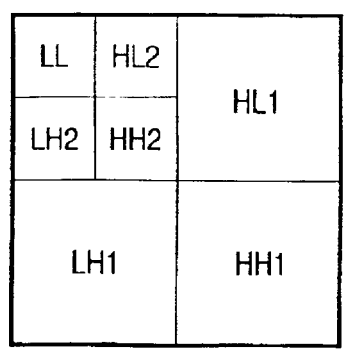

With the above processing, one-dimensional discrete wavelet transformation for the image signal is performed. Two-dimensional discrete wavelet transformation is executed by sequentially performing one-dimensional transformation for the image in the horizontal and vertical directions. Details of this processing are known, and a description thereof will be omitted here. FIG. 9C shows the structure of transform coefficient groups of two levels obtained by the two-dimensional transform processing. The image signal is decomposed into subbands HH1, HL1, LH1, . . . , LL. The coefficient of each subband is output to a quantization section 3 on the output side.

The quantization section 3 quantizes the received coefficients by a predetermined quantization step and outputs indices corresponding to the quantized values. Quantization is described by $$q=\text{sign}(c)\text{floor}(\text{abs}(c)/\Delta) \tag{3}$$

$$\text{sign}(c)=1;\ c>=0 \tag{4}$$

$$\text{sign}(c)=-1;\ c<0 \tag{5}$$

where c is the coefficient to be quantized. In this embodiment, 1 is included as a value Δ. In this case, the transform coefficients input to the quantization section 3 are directly output to an entropy encoding section 4 on the output side without performing actual quantization.

The entropy encoding section 4 decomposes the received quantization indices into bit planes in units of rectangular regions (to be referred to as code blocks hereinafter) obtained by segmenting the subband to a predetermined size, sequentially performs binary arithmetic encoding for the bit planes, and outputs a code stream. FIG. 2A is a view showing a subband segmented into code blocks CB. Referring to FIG. 2A, for example, the subband LL is segmented into four code blocks CB0 to CB3, and the quantization indices in the code blocks are subjected to bit plane encoding in the order of the code blocks CB0, CB1, CB2, and CB3.

Figure 2B:
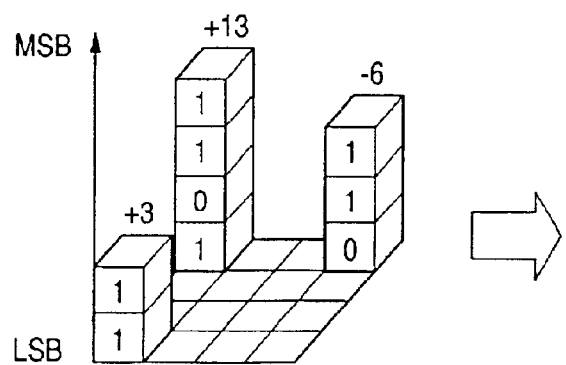
FIGS. 2B and 2C are explanatory views of operation of bit plane encoding by an entropy encoding section 4.

The entropy encoding section 4 scans the entire subband first to obtain a maximum value M and calculates the number S of bits necessary to express the maximum quantization index M by $$S=\text{ceil}(\log 2(\text{abs}(M))) \tag{6}$$

where ceil(x) is the smallest integer value of integers equal to or larger than x. In addition, even in each code block, the maximum number SB of bits is calculated from the maximum quantization index value. FIG. 2B is a view for explaining the bit plane encoding operation by the entropy encoding section 4. In this example, three non-zero quantization indices are present in a code block region having a size of 4×4, and the indices have values "+13", "−6", and "+3", respectively. The entropy encoding section 4 scans the entire code block to obtain a maximum value MB and then calculates the number SB of bits necessary to express the maximum quantization index by $$SB=\text{ceil}(\log 2(\text{abs}(MB))) \tag{7}$$

Figure 2C:
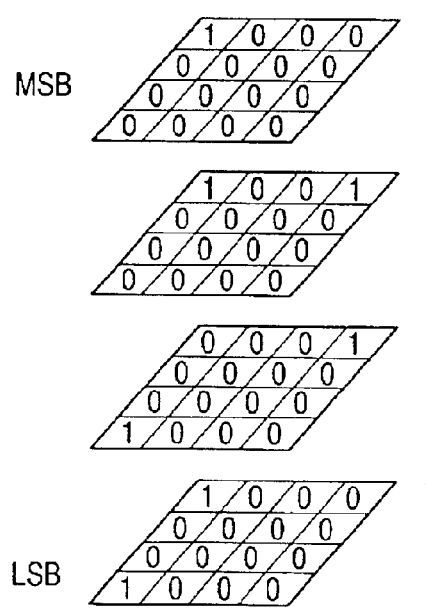

Referring to FIG. 2B, since the maximum coefficient value is 13, the number SB of bits is 4. The 16 quantization indices in the code block are processed in units of four bit planes, as shown in FIG. 2C. First, the entropy encoding section 4 performs binary arithmetic encoding for each bit of the most significant bit plane (MSB in FIG. 2C) and outputs a bit stream. The level of bit plane is lowered by one, each bit in the bit planes is encoded until the bit plane to be processed reaches a least significant bit plane LSB, and a bit stream is output to the code sequence construction section 11. At this time, for the sign of each quantization index, immediately after the first non-zero bit is detected by bit plane scanning, the sign of the quantization index is entropy-encoded. The number of actually encoded bit planes is also output to the code sequence construction section 11 and contained in a code sequence as a parameter, as will be described later. In this embodiment, each bit plane is executed by one path. However, each bit plane may be segmented into a plurality of encoding paths and executed. In this case, a corresponding encoding path is treated as one unit.

The code sequence construction section 11 constructs a code sequence of the received codes having predetermined header information and the like and outputs the code sequence to the code sequence storage section 10 or transmission section 14.

FIGS. 3A to 3E are schematic views showing the structures of the thus generated and output code sequence. FIG. 3A shows the entire structure of the code sequence. Reference symbol MH denotes a main header, TH; a tile header; and BS, a bit stream. As shown in FIG. 3B, the main header MH contains the size of the image to be encoded (the number of horizontal and vertical pixels), the size when the image is segmented into tiles as a plurality of rectangular regions, the number of components, which represents the number of color components, and component information representing the size and bit accuracy of each component. In this embodiment, since the image is not broken up into tiles, the tile size and image size take the same value. When the image to be processed is a monochrome grayscale image, the number of components is 1.

FIG. 3C shows the structure of the tile header TH. The tile header TH is formed from a tile length including the code length and header length of the tile, and an encoding parameter for the tile. The encoding parameter includes the level of discrete wavelet transformation and the filter type. FIG. 3D shows the structure of encoded data in this embodiment. Referring to FIG. 3D, the encoded data are put together in units of subbands which are arranged in ascending order of resolution sequentially from a subband with a low resolution. In each subband, the encoded data are arranged from the most significant bit plane to the least significant bit plane.

Encoded data related to the bit plane or encoding path of each code block are classified into a plurality of layers. Each layer is formed from encoded data related to an arbitrary number of bit planes or encoding paths from each code block. For example, when one layer contains encoded data related to one bit plane from each code block, one layer corresponds to one bit plane. Since the layers are formed starting from the upper bit plane toward the lower bit plane, an upper layer always contains encoded data of a bit plane located at a place on the upper side of that contained in the lower layer.

The codes of each layer are put together in units of code blocks, as shown in FIG. 3E. A field PH contains the difference between a corresponding bit plane S and the maximum bit plane SB of each code block, information for designating a code block contained in the layer, and the like. Referring to FIG. 3E, a layer L-1 contains codes of four code blocks. A code block whose corresponding code is not present in this layer can be specified from code block designation in the field PH. The code sequence storage section 10 stores the thus generated code sequence.

The function of the code sequence construction section 11 and a method of displaying an image according to the final encoded data output from the code sequence construction section 11 in a reduced state will be described next.

Referring to FIG. 1A, the display resolution of the decoded image is designated from an input device (not shown) to the image quality setting section 13. As the input device, in addition to a keyboard, mouse, or switch provided in the image processing apparatus, a computer connected to the image processing apparatus through a network can be used.

The display resolution corresponds to one of reduced images that can be composited and generated from the subband structure obtained by discrete wavelet transformation as shown in FIG. 9C. The image quality setting section 13 determines the output resolution for the code sequence to be output from the code sequence construction section 11 on the basis of the input display resolution and gives an output instruction to the code sequence construction section 11. The output instruction may be given through a system (not shown) or the transmission section 14, as shown in FIG. 1A.

Figure 4A:
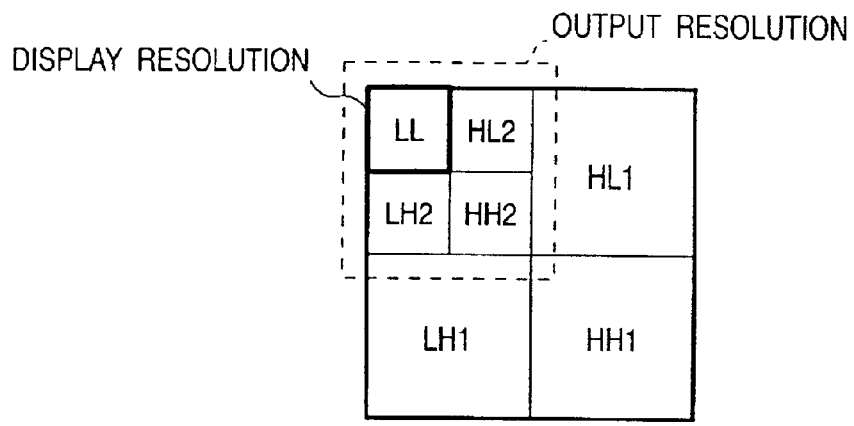
FIGS. 4A and 4B are views showing a display resolution and output resolution of encoded data output from a transmission section 14.
Figure 4B:
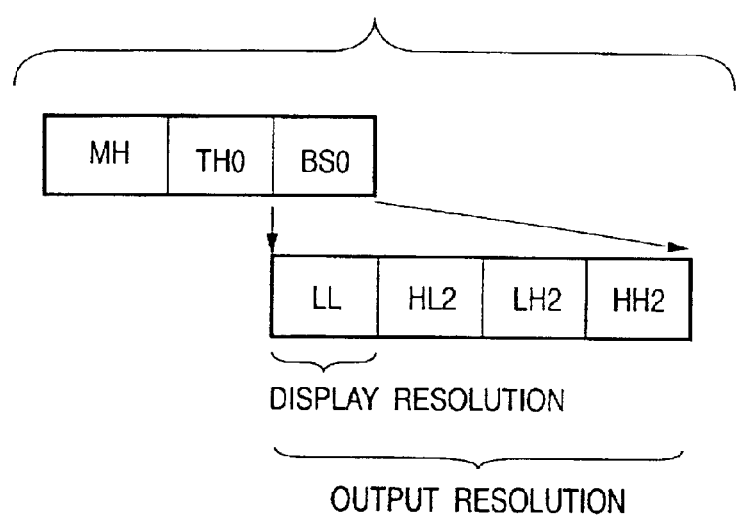

On the basis of the instruction from the image quality setting section 13, the code sequence construction section 11 reads out encoded data with the output resolution from the code sequence previously stored in the code sequence storage section 10 and outputs the encoded data to the transmission section 14. FIGS. 4A and 4B are views showing the display resolution and output resolution at this time. Referring to FIGS. 4A and 4B, the display resolution corresponds to the resolution of the subband LL shown in FIG. 4A. However, since the output resolution determined by the image quality setting section 13 is a resolution higher by one level, the output code sequence contains the encoded data of the subbands HL2, LH2, and HH2 in addition to that of the subband LL, as shown in FIG. 4B.

The output code sequence is decoded by the decoder DEC through the transmission section 14 to reconstruct the image signal. Operation of the decoder DEC and a series of operation until image display will be described below.

An entropy decoding section 5 extracts necessary information by analyzing the header of the received code sequence, and decodes and outputs the bit stream of the received code sequence. Decoding is sequentially performed from the upper bit plane to the lower bit plane by analyzing the code sequence shown in FIG. 3E and extracting the encoded data in a predetermined code block from each layer.

Figures 13A, 13B:
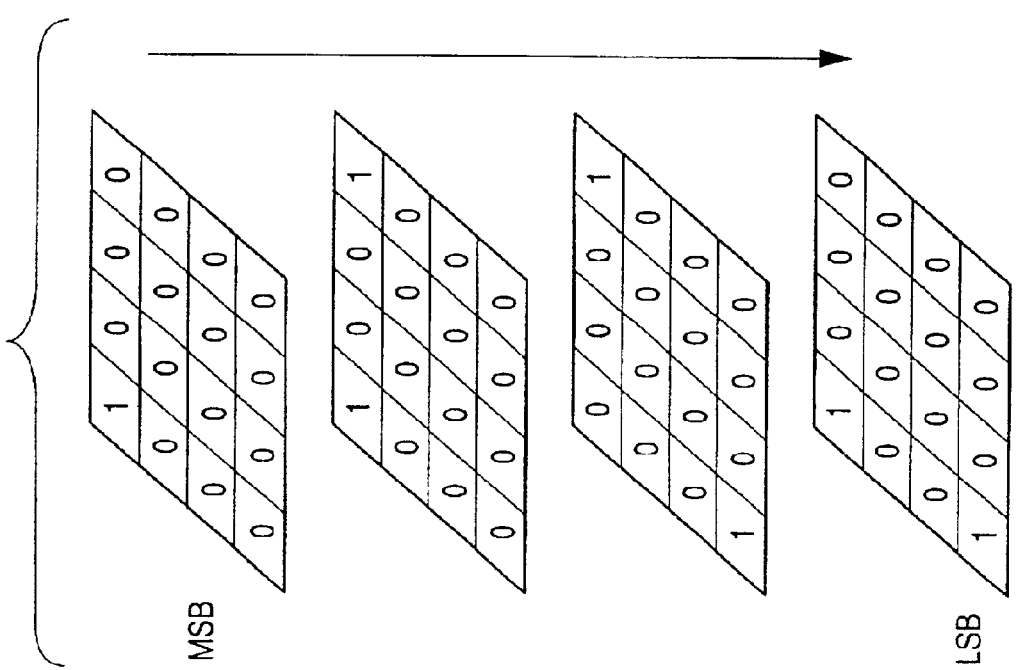
FIGS. 13A and 13B are explanatory views of processing by an entropy decoding section 5.

The decoding procedure is shown in FIGS. 13A and 13B. FIG. 13A is a view showing a flow in which code blocks in the subband to be decoded are sequentially decoded in units of bit planes, and the quantization indices are finally reconstructed. The bit planes are decoded in the direction indicated by the arrow in FIG. 13A. The restored quantization indices are output to an inverse quantization section 6.

The inverse quantization section 6 reconstructs the discrete wavelet transform coefficients from the received quantization index on the basis of $$c' = \Delta * q; \quad q \neq 0 \tag{8}$$

$$c' = 0; \quad q = 0 \tag{9}$$

where q is the quantization index, $\Delta$ is the quantization step which has the same value as that used for encoding, and c' is the reconstructed transform coefficient, i.e., the reconstructed coefficient s or d in encoding. The transform coefficient c' is output to an inverse discrete wavelet transform section 7 on the output side.

Figure 14A:
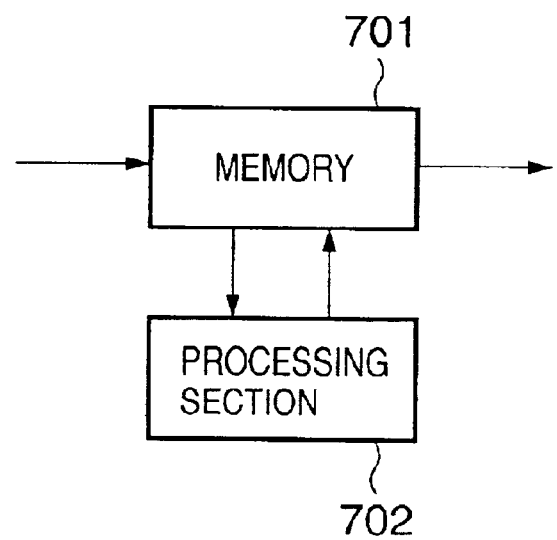
FIGS. 14A and 14B are explanatory views of an inverse discrete wavelet transform section 7.
Figure 14B:
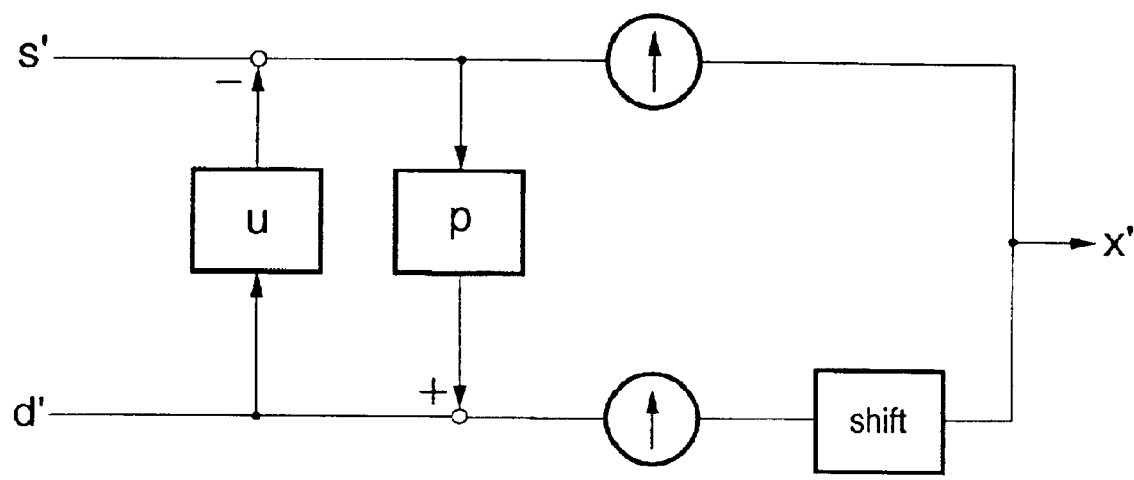

FIGS. 14A and 14B are views showing the arrangement and processing of the inverse discrete wavelet transform section 7. Referring to FIG. 14A, the received transform coefficient is stored in a memory 701. A processing section 702 executes one-dimensional inverse discrete wavelet transformation and performs the processing while sequentially reading out the transform coefficients from the memory 701, thereby executing two-dimensional inverse discrete wavelet transformation. The two-dimensional discrete wavelet transformation is executed by a procedure opposite to the forward procedure. Details are known, and a description thereof will be omitted. FIG. 14B shows the processing block of the processing section 702. The received transform coefficients undergo filter processing by two filters u and p and are superposed after upsampling to output an image signal x'. These processing operations are performed by $$x'(2*n)=s'(n)-\text{floor}((d'(n-1)+d'(n))/4) \qquad (10)$$

$$x'(2*n+1)=d'(n)+\text{floor}((x'(2*n)+x'(2*n+2))/2) \qquad (11)$$

The image signal reclaimed in this way is output to the image construction section 8 on the output side. All subbands contained in the received code sequence are decoded by the above-described series of processing operations, and the image signal having the output resolution previously determined by the image quality setting section 13 is reconstructed by inverse discrete wavelet transformation and output to the image construction section 8.

The image construction section 8 receives the display resolution previously input from the image quality setting section 13, compares the display resolution with the resolution input from the decoder DEC, and when the resolution of the received image signal equals the display resolution, directly outputs the image signal to the image output section 12.

On the other hand, when the resolution of the image received from the decoder DEC is different from the display resolution, the image construction section 8 applies a predetermined resolution transformation method to the received image to generate an image corresponding to the display resolution and outputs the image to the image output section 12.

As described above, in this embodiment, the image quality setting section 13 instructs the code sequence construction section 11 to output encoded data related to a resolution higher than the display resolution by one level. The image construction section 8 converts the resolution of the image decoded by the decoder DEC such that the resolution matches the display resolution, and outputs the image.

When an image having a resolution higher than the display resolution is decoded, an image signal containing a high-frequency component necessary to express an accurate image can be obtained. As compared to a case wherein an image is decoded from only a subband with the display resolution, the image quality of a character portion or edge portion contained in the image can be greatly improved.

In this embodiment, encoded data related to a resolution higher than the display resolution by one level is output. However, encoded data related to a resolution higher by two or more levels may be output in accordance with the required image quality.

In the above-described embodiment, the decoder DEC may not decode all bit planes, as needed. More specifically, for only the subband LL in the output code sequence shown in FIG. 4A, all layers contained in the code sequence are decoded, though for the subbands HL2, LH2, and HH2, decoding may be stopped at a predetermined layer, and subsequent processing may be performed.

With this processing, the image quality of a reduced image is improved by reconstructing a high-frequency component at a predetermined accuracy, while the time required for entropy decoding can be shortened. At this time, the image quality setting section 13 may instruct the decoder DEC to output only some upper layers for a predetermined high-frequency component. In this case, since all layers need not be decoded by the decoder DEC, the processing can be executed at a higher speed.

<Second Embodiment>

In the above-described first embodiment, the output code sequence is arranged in units of subbands. However, another arrangement may be employed. A case wherein a code sequence constructed by a code sequence construction section 11 has another form will be described below.

FIGS. 5A to 5E are views showing the structure of a code sequence by the code sequence construction section 11 according to this embodiment. The structures shown in FIGS. 5A to 5C are the same as in the first embodiment, and a detailed description thereof will be omitted. Referring to FIG. 5D, encoded data are put together in units of layers, and each layer contains a predetermined amount of encoded data in each subband.

The encoded data in each subband is formed from encoded data corresponding to a predetermined number of bit planes or encoding paths from the code block in the subband. Operation of each section in outputting an image when such a code sequence is formed will be described below.

Figure 6A:
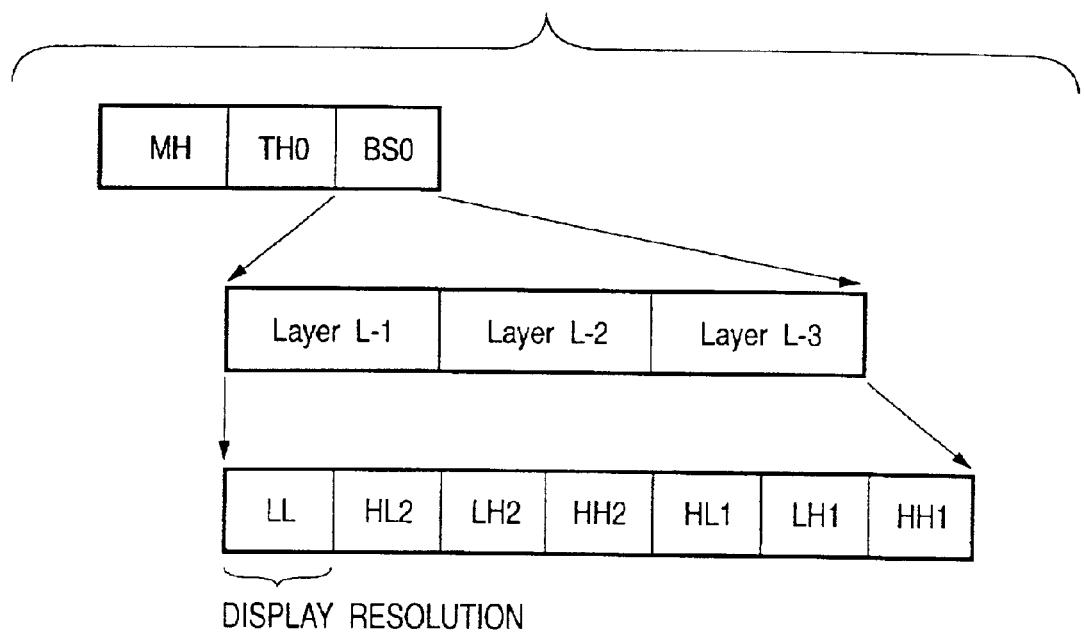
FIG. 6A is a view showing the structure of a code sequence by the code sequence construction section 11 according to the second embodiment of the present invention.

An image quality setting section 13 outputs an instruction to the code sequence construction section 11 to output a code sequence related to a predetermined number of layers. FIG. 6A shows the structure of the code sequence at this time, in which the code sequence of three upper layers is output. On the other hand, as in the first embodiment, the image quality setting section 13 receives and stores a display resolution from an input device (not shown), and also outputs the number of levels of inverse discrete wavelet transformation to an inverse discrete wavelet transform section 7 of a decoder DEC.

The decoder DEC decodes the code sequence according to the same procedure as described above, so quantization indices are reconstructed. Additionally, in this embodiment, for a series of received transform coefficients, the inverse discrete wavelet transform section performs inverse transformation of the inverse transform level previously input from the image quality setting section 13 and outputs the generated image signal to an image construction section 8. The range of the image signal obtained by inverse transformation is adjusted to the range of the original signal.

Figure 6B:
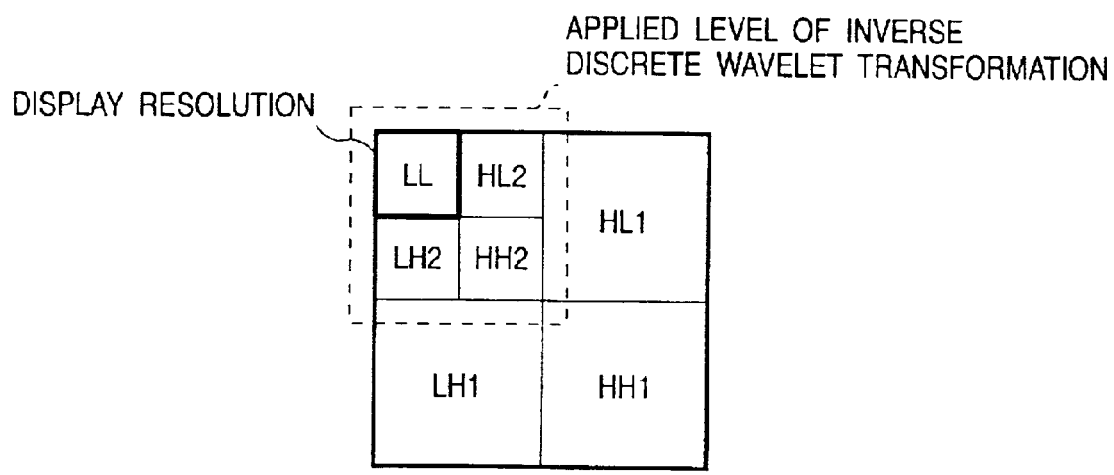
FIG. 6B is a view showing a display resolution and applied level in inverse discrete wavelet transformation in the second embodiment of the present invention.

For example, assume that when the data of subband decoded from the three upper layers corresponds to 2-level discrete wavelet transformation, and the display resolution corresponds to the resolution of a subband LL, as shown in FIG. 6B, the number of levels of the inverse discrete wavelet transformation designated by the image quality setting section 13 is 1, an image signal with a resolution higher by one level than that of the subband LL is reconstructed by the inverse transformation, as shown in FIG. 6B.

The reconstructed image signal has a resolution twice the display resolution. The signal obtained by 1-level inverse transformation is discrete wavelet transform coefficients and can be treated as an image signal by normalizing the range of the signal in accordance with the range of the output device.

The image signal obtained by the above method is output to an image output section 12 after its resolution is converted such that it matches the display resolution by an image construction section 8, as in the first embodiment.

<Third Embodiment>

In the above-described first and second embodiments, the image is not segmented into tiles. However, the present invention is not limited to this, and an image may be segmented into a plurality of tiles. In addition, the output resolution set by the image quality setting section may be changed in units of tiles.

In the third embodiment, an image quality setting section 13 outputs both a display resolution and an output resolution to a code sequence construction section 11. The code sequence construction section 11 stores an image type of each tile in advance by a predetermined method and reconstructs the code sequence such that a code sequence with the output resolution is output for a predetermined tile, and a code sequence with the display resolution is output for the remaining tiles.

Figure 4C:
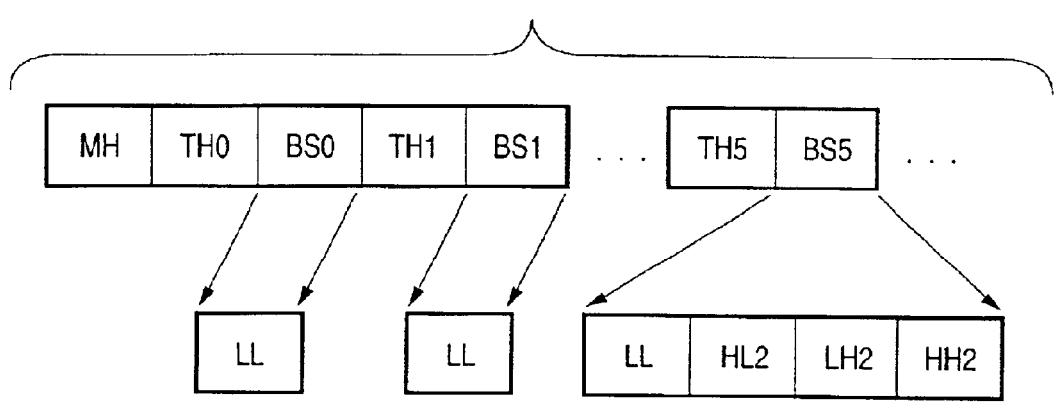
FIG. 4C is a view showing an output code sequence when an image is segmented into a plurality of tiles in the third embodiment.

FIG. 4C is a view showing an output code sequence when an image is segmented into a plurality of tiles. Referring to FIG. 4C, in tiles 0 and 1, only encoded data of a subband LL is contained in the output code sequence. However, for tile 5, encoded data of a subband for a resolution higher by one level is also contained.

To display an image from the code sequence with such a structure, an image construction section 8 compares the display resolution with the decoding resolution of each tile. If the display resolution is different from the resolution of the decoded image, the resolution is converted. Otherwise, the image is directly output so that an entirely reduced image can be displayed on an image output section 12.

<Fourth Embodiment>

FIG. 7 is a block diagram of an image processing apparatus according to the fourth embodiment of the present invention. First, an outline of operation of this image processing apparatus will be described with reference to FIG. 7. An example of application field of this image processing apparatus is a copying machine connected to a network or a digital camera.

Referring to FIG. 7, an image input from an image input section 1 is compression-coded by an image encoder ENC, and the generated code sequence is output to a code sequence construction section 11 on the output side. The code sequence construction section 11 constructs the received code sequence by a predetermined method and outputs the code sequence to a code sequence storage section 10 or an external device.

The code sequence storage section 10 is a storage medium such as a memory or hard disk for storing a compression-coded image. The code sequence stored in the code sequence storage section 10 is read out as needed, and the code sequence transmitted to the decoding side is reconstructed into an image by an image decoder DEC, and displayed or output from an image output section 12.

Assume that the image processing apparatus is a copying machine connected to a network. The image input section 1 corresponds to a scanner portion prepared in the copying machine. The image decoder DEC is, e.g., incorporated in a computer connected through the network. The image output section 12 corresponds to the monitor of the computer.

In this case, image data encoded in the copying machine is stored in the copying machine. A code sequence is sent to the computer through the network on the basis of an instruction from the computer on the network such that a reduced image of the stored image data can be displayed on the computer. When a large amount of documents is to be processed by the copying machine, the progress of processing can be monitored from the computer connected through the network.

Assume that the image processing apparatus is a digital camera. Both the image encoder ENC and the image decoder DEC are arranged in the digital camera main body. The image input section 1 corresponds to an image sensing device such as a CCD. The code sequence storage section 10 corresponds to a memory in the camera main body. The image output section 12 corresponds to a compact liquid crystal monitor provided in the camera main body.

In this case, a sensed image is compression-coded by the image encoder ENC, stored in the memory in the camera main body, and displayed on the liquid crystal monitor as needed. At this time, a reduced image within the size of the liquid crystal monitor is generated from a code sequence and displayed.

In either example, to display the compression-coded image, a reduced image having a resolution lower than the original resolution is displayed. Operation of each section of the image processing apparatus will be described below in detail.

Figure 8:
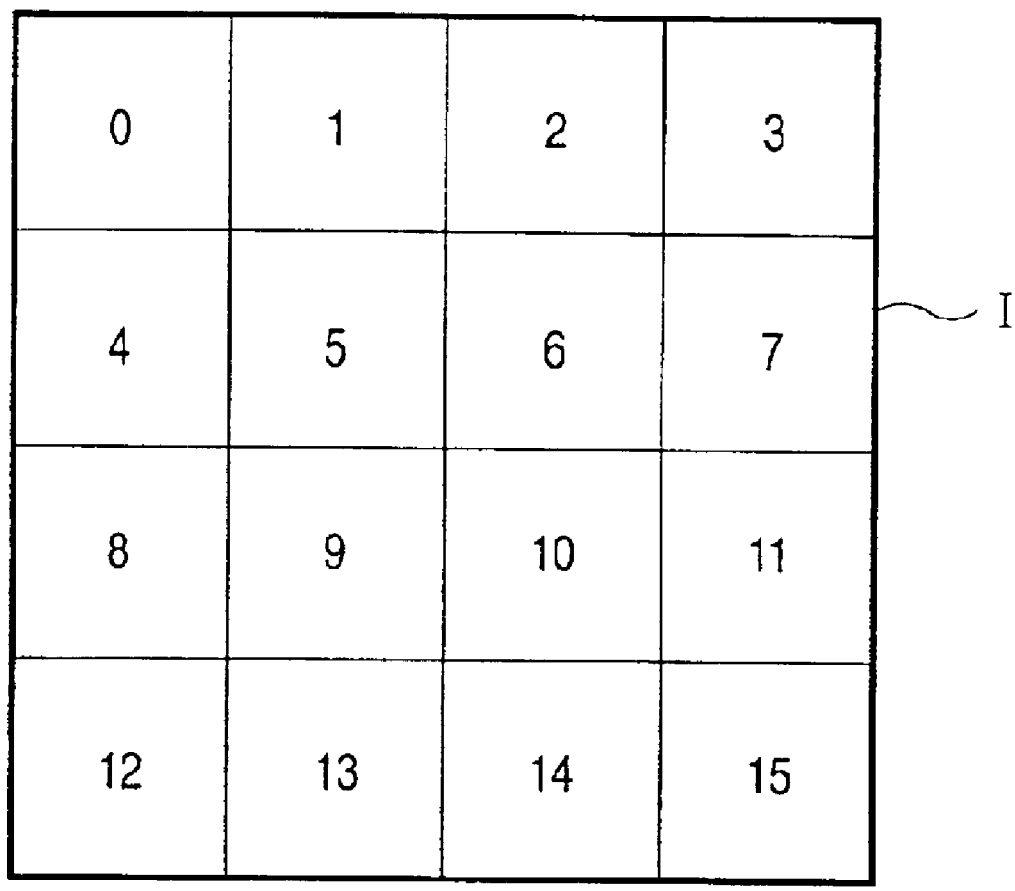
FIG. 8 is an explanatory view showing a form wherein an image is segmented into tiles.

An image signal is segmented into predetermined regions, in this case, rectangular tiles each having a predetermined size and output by the image input section 1. FIG. 8 is a view showing an example in which an image is segmented into tiles. An image I to be processed is segmented into 16 tiles having the same size. The thus segmented image signal is sequentially output in units of tiles to a discrete wavelet transform section 2 of the image encoder ENC and a region determination section 9 on the output side.

The region determination section 9 discriminates the characteristics of the image input in units of tiles. In this embodiment, the region determination section 9 determines types such as a natural image and text image as types of image. For this discrimination scheme, a known discrimination scheme can be used. For example, the histogram of pixel values in the image input in units of tiles is calculated, and its distribution is used. The discrimination result is output to the code sequence construction section 11. The code sequence construction section 11 will be described later.

The image signal output from the image input section 1 in units of tiles is subjected to discrete wavelet transformation by the discrete wavelet transform section 2 on the output side. The discrete wavelet transform section 2 executes two-dimensional discrete wavelet transform processing for the received image signal and calculates and outputs transform coefficients. FIG. 9A shows the basic arrangement of the discrete wavelet transform section 2. The received image signal is stored in a memory 201, sequentially read out and transformed by a processing section 202, and written in the memory 201 again.

FIG. 9B shows the arrangement of the processing section 202. The input image signal is separated into even and odd address signals by a combination of a delay element and down sampler, and filter processing is executed by two filters p and u. Referring to FIG. 9B, s and d denote low- and high-pass coefficients in decomposing a one-dimensional image signal to one level and are given by $$d(n)=x(2*n+1)-\text{floor}((x(2*n)+x(2*n+2))/2) \qquad (12)$$

$$s(n)=x(2*n)+\text{floor}((d(n-1)+d(n))/4) \qquad (13)$$

where x(n) is the image signal to be transformed.

With the above processing, one-dimensional discrete wavelet transformation for the image signal is performed.

Two-dimensional discrete wavelet transformation is executed by sequentially performing one-dimensional transformation for the image in the horizontal and vertical directions. Details of this processing are known, and a description thereof will be omitted here. FIG. 9C shows the structure of transform coefficient groups of two levels obtained by the two-dimensional transform processing. The image signal is decomposed into subbands HH1, HL1, LH1, . . . , LL. The coefficient of each subband is output to a quantization section 3 on the output side.

The quantization section 3 quantizes the received coefficients by a predetermined quantization step and outputs indices corresponding to the quantized values. Quantization is described by $$q = \text{sign}(c)\text{floor}(\text{abs}(c)/\Delta) \quad (14)$$

$$\text{sign}(c) = 1; \quad c >= 0 \quad (15)$$

$$\text{sign}(c) = -1; \quad c < 0 \quad (16)$$

where c is the coefficient to be quantized. In this embodiment, 1 is included as a value $\Delta$. In this case, the transform coefficients input to the quantization section 3 are directly output to an entropy encoding section 4 on the output side without performing actual quantization.

The entropy encoding section 4 decomposes the received quantization indices into bit planes, performs binary arithmetic encoding in units of bit planes, and outputs a code sequence.

Figure 10A:
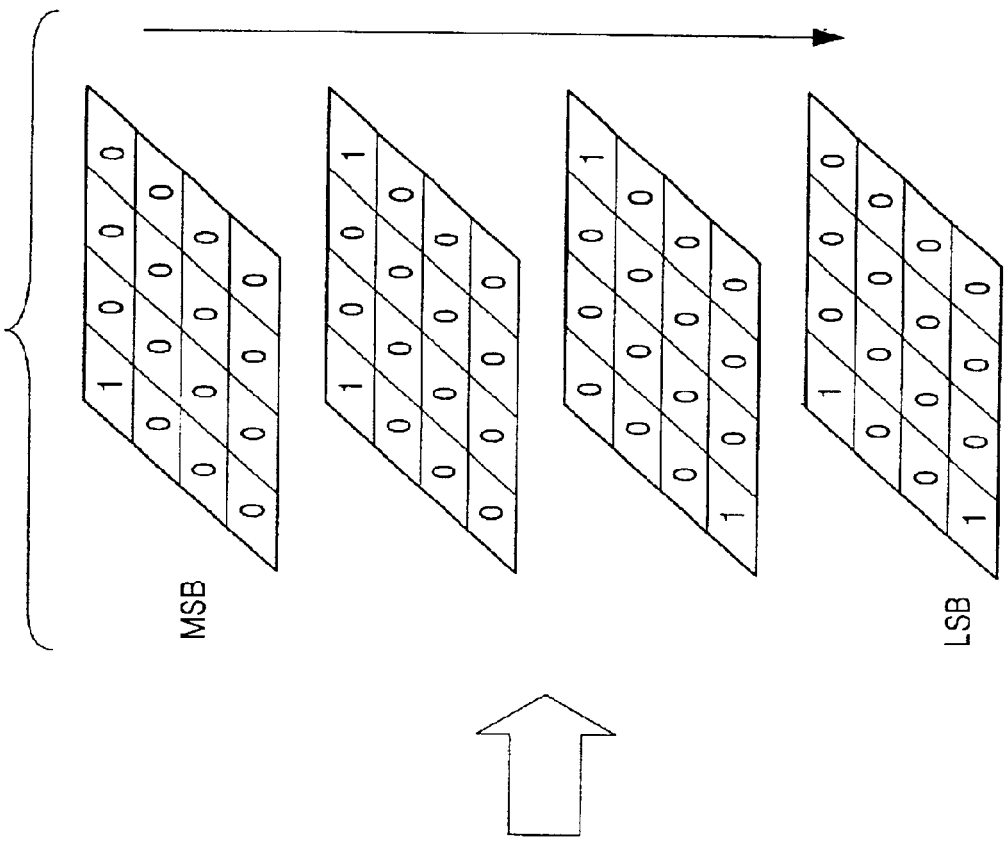
FIGS. 10A and 10B are explanatory views of processing by an entropy encoding section 4.
Figure 10B:
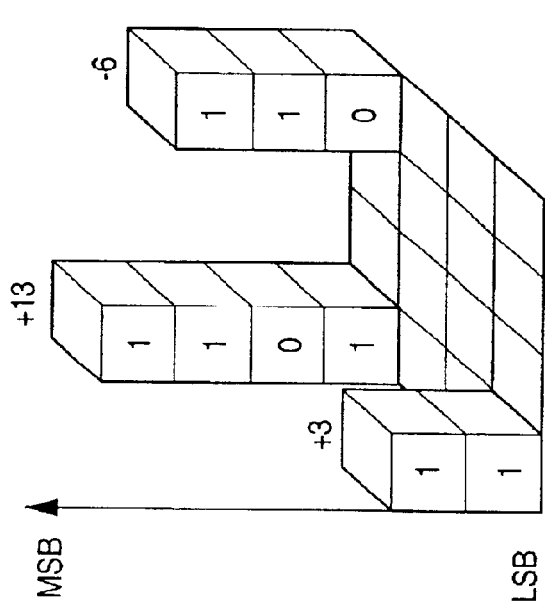

FIGS. 10A and 10B are views for explaining operation of the entropy encoding section 4. In this example, three non-zero quantization indices are present in a subband region having a size of 4×4, and the indices have values "+13", "−6", and "+3", respectively. The entropy encoding section 4 scans this region to obtain a maximum value M and then calculates the number S of bits necessary to express the maximum quantization index by $$S = \text{ceil}(\log 2(\text{abs}(M))) \quad (17)$$

where ceil(x) is the smallest integer value of integers equal to or larger than x. Referring to FIGS. 10A and 10B, since the maximum coefficient value is 13, the number S of bits is 4. The 16 quantization indices in the sequence are processed in units of four bit planes, as shown in FIG. 10B. First, the entropy encoding section 4 performs binary arithmetic encoding for each bit of the most significant bit plane (MSB in FIG. 2C) and outputs a bit stream. The level of bit plane is lowered by one, each bit in the bit planes is encoded until the bit plane to be processed reaches a least significant bit plane (LSB in FIG. 10B), and a code stream is output to the code output section 5. At this time, for the sign of each quantization index, immediately after the first non-zero bit is detected by bit plane scanning, the sign of the quantization index is entropy-encoded. The thus generated code sequence is output to the code sequence construction section 11 on the output side.

The type of tile output from the region determination section 9 is input to the code sequence construction section 11. The code sequence construction section 11 constructs the final code sequence on the basis of the data from the region determination section 9 and entropy encoding section 4. The constructed code sequence is stored in a code sequence storage section 10.

Figures 11A, 11B, 11C, 11D:
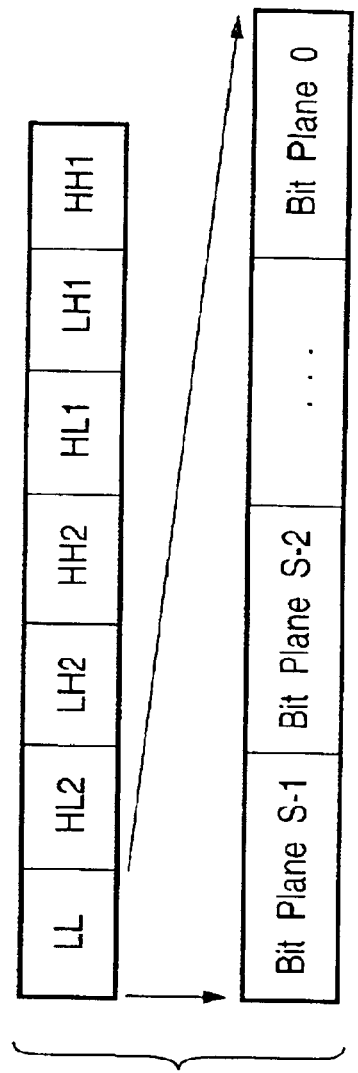
FIGS. 11A to 11D are explanatory views of code sequences generated by the image processing apparatus according to the fourth embodiment of the present invention.

FIGS. 11A to 11D are schematic views showing the structures of the thus generated and output code sequence. FIG. 11A shows the entire structure of the code sequence. Reference symbol MH denotes a main header, TH; a tile header; and BS, a bit stream.

As shown in FIG. 11B, the main header MH contains the size of the image to be encoded (the number of horizontal and vertical pixels), the size when the segmented image is further segmented into tiles as a plurality of rectangular regions, the number of components, which represents the number of color components, and component information representing the size and bit accuracy of each component. In this embodiment, since the image is not segmented into (sub)tiles, the tile size and image size take the same value. When the image to be processed is a monochrome grayscale image, the number of components is 1.

FIG. 11C shows the structure of the tile header TH. The tile header TH is formed from a tile length including the bit stream length and header length of the tile, and an encoding parameter for the tile. The encoding parameter includes the level of discrete wavelet transformation and the filter type. The tile type is data representing the tile type determined by the above-described region determination section 9.

FIG. 11D shows the structure of the bit stream in this embodiment. Referring to FIG. 11D, the bit streams are put together in units of subbands which are arranged in ascending order of resolution sequentially from a subband with a low resolution. In each subband, the bit streams are arranged from the most significant bit plane to the least significant bit plane, and the codes are arranged in units of bit planes.

The function of the code sequence construction section 11 and a method of displaying an image according to the final encoded data output from the code sequence construction section 11 in a reduced state will be described next.

Referring to FIG. 7, the display resolution of the decoded image is designated from an input device (not shown) to the code sequence construction section 11. That is, the code sequence construction section 11 also functions as a means for receiving an input of the resolution of the decoded image. As the input device, in addition to a keyboard, mouse, or switch provided in the image processing apparatus, a computer connected to the image processing apparatus through a network can be used.

The resolution corresponds to one of reduced images that can be composited and generated from the subband structure obtained by discrete wavelet transformation as shown in FIG. 9C. The code sequence construction section 11 reconstructs and outputs a code sequence to be output to the decoding side on the basis of the code sequence stored in the code sequence storage section 10.

Figure 12A:
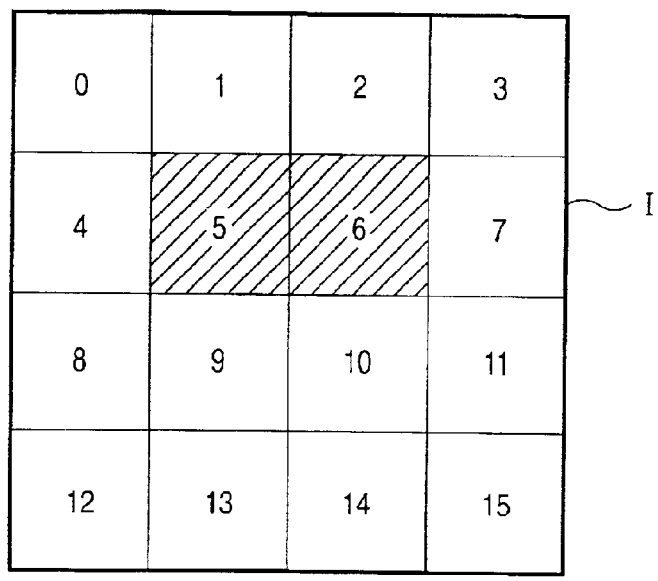
FIGS. 12A and 12B are explanatory views of a code sequence generated by a code sequence construction section 11.
Figure 12B:
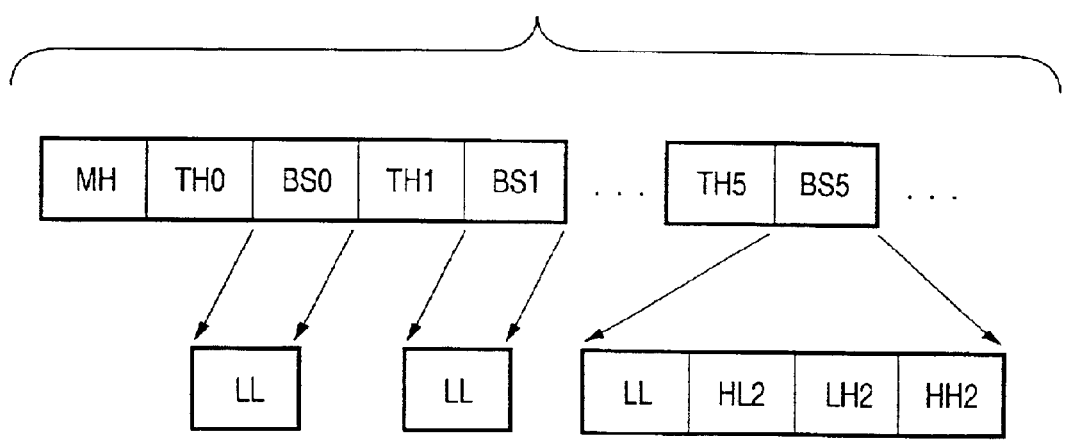

FIGS. 12A and 12B are views showing the relationship between the image segmented into tiles and the code sequence reconstructed by the code sequence construction section 11 in correspondence with the image. FIG. 12A shows the image segmented into tiles. Tiles 5 and 6 are discriminated as text regions by the region determination section 9. FIG. 12B shows part of the code sequence reconstructed for this image. When the resolution designated from the external device to the code sequence construction section 11 corresponds to a subband LL by discrete wavelet transformation, the bit stream of each tile in the reconstructed code sequence is formed from only codes of the subband LL if the tile is a natural image. However, for the two tiles shown in FIG. 12A, not only codes of the subband LL but also codes corresponds to three subbands HL2, LH2, and HH are contained.

To reconstruct a code sequence, the tile type in the tile header TH of the code sequence previously stored in the code sequence storage section 10 is referred to, and if the tile is a natural image, only the subband LL is output; otherwise, the subbands HL2, LH2, and HH2 are output in addition to the subband LL. The resultant code sequence is sent to the decoding side through a predetermined transmission path and decoded by a decoder DEC. Decoding processing and image reconstruction of this embodiment will be further described below.

An entropy decoding section 5 decodes the bit stream of the received code sequence in units of bit planes and outputs the bit stream. The decoding procedure is shown in FIGS. 13A and 13B. FIG. 13A is a view showing a flow in which a region of the subband to be decoded is sequentially decoded in units of bit planes, and the quantization indices are finally reconstructed. The bit planes are decoded in the direction indicated by the arrow in FIG. 13A. The reconstructed quantization indices are output to an inverse quantization section 6.

The inverse quantization section 6 reconstructs the discrete wavelet transform coefficients from the received quantization index on the basis of $$c'=\Delta *q; \quad q \neq 0 \tag{18}$$

$$c'=0; \quad q=0 \tag{19}$$

where q is the quantization index, $\Delta$ is the quantization step which has the same value as that used for encoding, and c' is the reconstructed transform coefficient, i.e., the reconstructed coefficient s or d in encoding. The transform coefficient c' is output to an inverse discrete wavelet transform section 7 on the output side.

FIGS. 14A and 14B are views showing the arrangement and processing of the inverse discrete wavelet transform section 7. Referring to FIG. 14A, the received transform coefficients are stored in a memory 701. A processing section 702 executes one-dimensional inverse discrete wavelet transformation and performs the processing while sequentially reading out the transform coefficients from the memory 701, thereby executing two-dimensional inverse discrete wavelet transformation. The two-dimensional discrete wavelet transformation is executed by a procedure opposite to the forward procedure. Details are known, and a description thereof will be omitted. FIG. 14B shows the processing block of the processing section 702. The received transform coefficients undergo filter processing by two filters u and p and are superposed after upsampling to output an image signal x'. These processing operations are performed by $$x'(2*n)=s'(n)-\text{floor}((d'(n-1)+d'(n))/4) \tag{20}$$

$$x'(2*n+1)=d'(n)+\text{floor}((x'(2*n)+x'(2*n+2))/2) \tag{21}$$

The image signal reconstructed in this way is output to an image construction section 8 on the output side. The above-described series of processing operations are independently performed in units of tiles of the code sequence, and all subbands contained in the received bit stream are decoded. In this embodiment, only the subband LL is used to decode a tile as a natural image, and the subbands LH2, HL2, and HH2 are used to decode a tile as a text image. Hence, in this embodiment, a tile corresponding to a text image is reconstructed as an image having a resolution twice that of a tile corresponding to a natural image in both the vertical and horizontal directions.

The image construction section 8 constructs an image to be finally displayed on the image output section 12 on the basis of the type of each tile and the resolution required of the reconstructed image. When the tile is a natural image, the image construction section 8 directly outputs the reconstructed image signal to the image output section 12 on the output side without any processing. On the other hand, when the tile is a text image, the image construction section 8 performs resolution transformation such that the resolution of the tile becomes ½ in the horizontal and vertical directions and then outputs the image signal to the image output section 12. A known technique such as cubic interpolation can be used to convert the resolution, and a detailed description thereof will be omitted.

As described above, in this embodiment, when an image is segmented into tiles, and an independently encoded code sequence is decoded to generate a reduced image, a code in a high-frequency region is added for a specific tile to generate an image in a wider band, and then, reduction processing is executed while maintaining prescribed image quality, thereby generating the image to be finally displayed.

With this processing, the reduced image can be generated while maintaining specific information, unlike a case wherein the subband structure by normal discrete wavelet transformation is directly used. For this reason, a portion such as a text image that particularly requires detailed information can be displayed at a high image quality. In addition, since only necessary parts of the compression-coded data are contained in the code sequence, the transmission overhead in transmitting the code sequence can be minimized, and the image can be quickly displayed.

<Fifth Embodiment>

In the above-described fourth embodiment, before encoding, the image is segmented into tiles, and processing is executed in units of tiles. The same effect as described above can be obtained even using a structure obtained by segmenting a subband by discrete wavelet transformation into blocks. An embodiment for such a structure will be described below. The arrangement of the apparatus of this embodiment is the same as in that shown in FIG. 7, and only different points will be described.

Figure 15A:
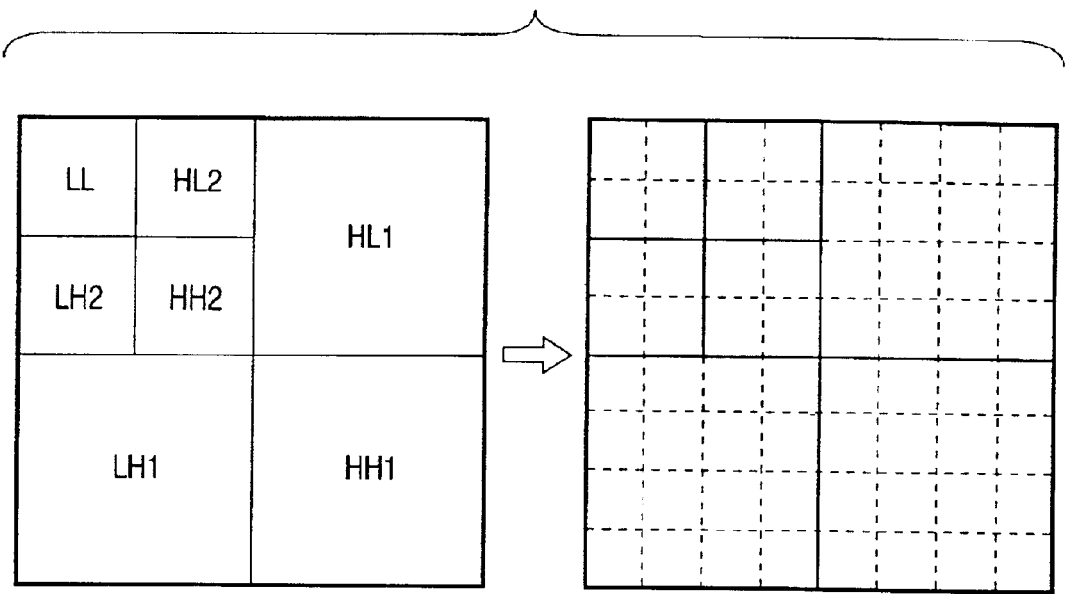
FIGS. 15A and 15B are explanatory views of block segmentation of a subband and its code sequence in the fifth embodiment of the present invention.
Figure 15B:
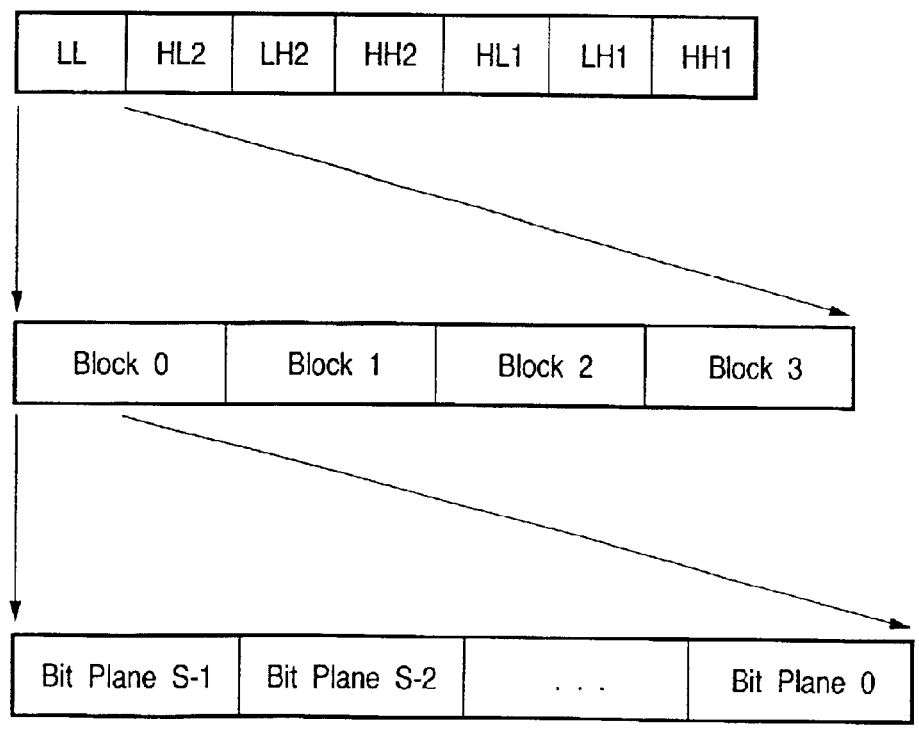

FIGS. 15A and 15B are views showing a block as a unit for encoding and a generated code sequence. On the left side of FIG. 15A, an image is segmented into seven subbands by 2-level discrete wavelet transformation. Each subband is further segmented into regions of a predetermined unit, i.e., blocks having the same size, which are indicated by broken lines on the right side of FIG. 15A.

The blocks are independently encoded. The encoding method is the same as that described in the first embodiment. The blocks are independently quantized and encoded in units of bit planes.

FIG. 15B is a view showing the structure of a bit stream in the code sequence obtained by encoding. The bit stream is formed from encoded data that are independent in units of blocks. The codes of each block are arranged from the upper bit plane to the lower bit plane. The remaining portions are the same as in the first embodiment.

Figure 16A:
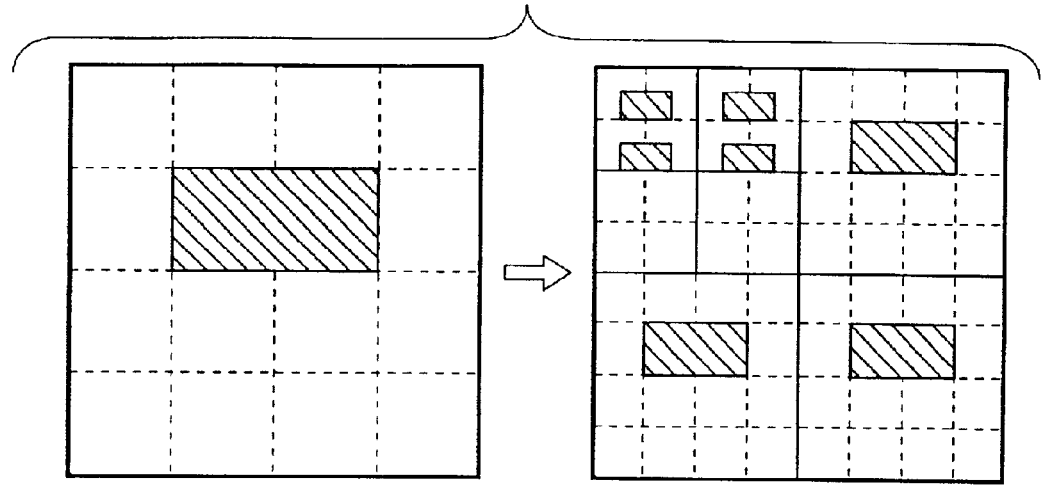
FIGS. 16A to 16C are explanatory views of a decoded image composition procedure in the fifth embodiment of the present invention.
Figure 16B:
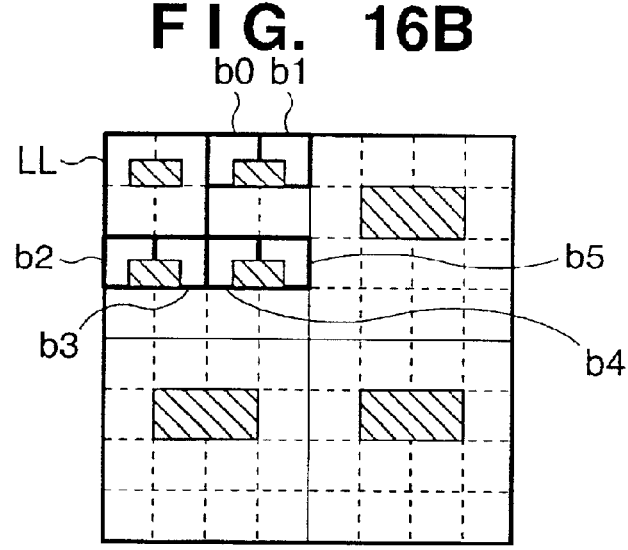

In this embodiment, in reconstructing an image, a code sequence construction section 11 specifies a block corresponding to a text image and constructs a code sequence to be sent to the decoding side, as shown in FIG. 16A. More specifically, assume that a shaded portion is a text image, as shown on the left side of FIG. 16A. When 2-level discrete wavelet transformation is performed for that region, the region corresponds to a shaded portion on the right side of FIG. 16A.

To display a reduced image having the resolution of a subband LL, the code sequence construction section 11 adds not only all blocks of the subband LL but also blocks including a text region in subbands HL2, LH2, and HH2 to the code sequence to be output.

HL2: b0, b1
LH2: b2, b3
HH2: b4, b5

Figure 16C:
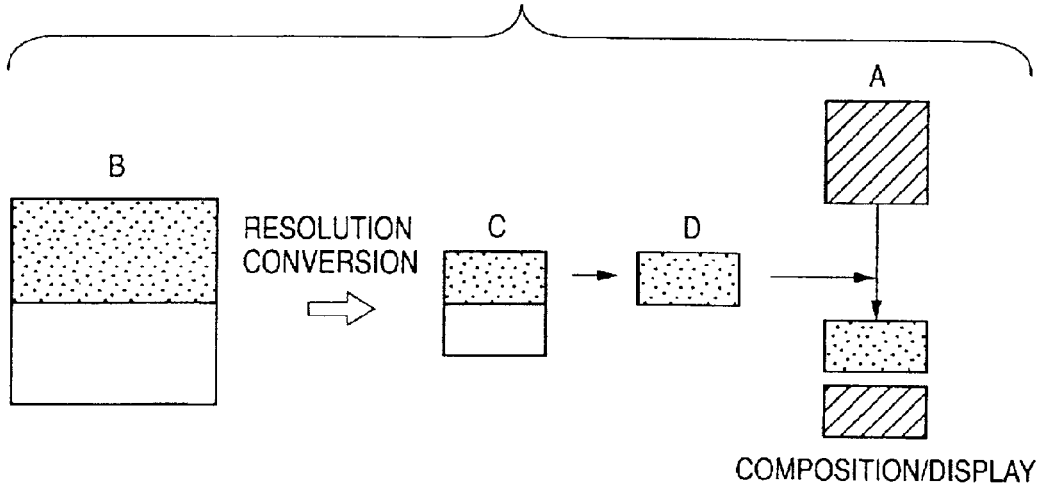
Figure 17A:
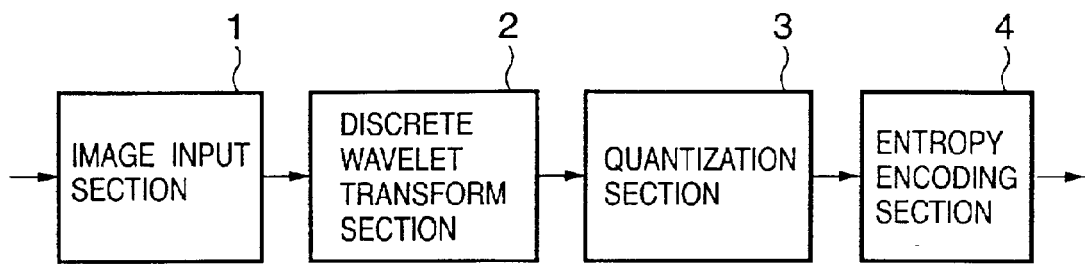
FIGS. 17A to 17D are explanatory views of an image processing apparatus of a prior art.
Figure 17B:
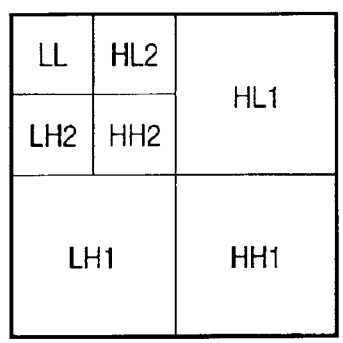
Figure 17C:
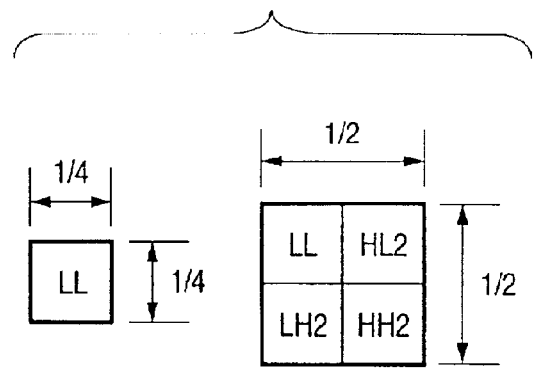
Figure 17D:
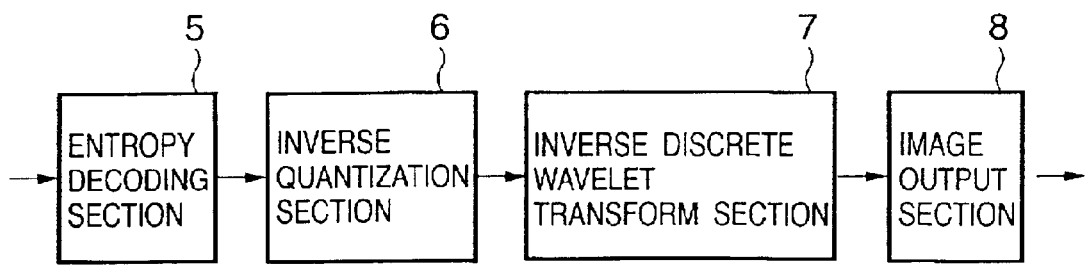

An image decoder DEC on the decoding side decodes the thus constructed code sequence to generate an image (to be referred to as an image A hereinafter) having the same resolution as that of the subband LL first, as shown in FIG. 16C. On the other hand, the decoder DEC generates an image (to be referred to as an image B hereinafter) having a resolution twice that of the subband LL using the decoded subband LL and the subbands HL2, LH2, and HH2. In the subbands except the subband LL, only two of the four blocks have coefficients. Inverse discrete wavelet transformation is performed by regarding all coefficients of the missed portions as 0.

An image construction section 8 performs predetermined resolution conversion for the image B obtained by the above operation to generate an image (to be referred to as an image C hereinafter) having the same resolution as that of the subband LL, composites a portion D in the image C, which corresponds to a text image, with the previously generated image A to generate an image to be finally output, and outputs the image to an image output section 12.

The fourth and fifth preferable embodiments of the present invention have been described above. In the fourth and fifth embodiments, for a portion corresponding to a text image, an image having a resolution higher than that of the remaining portions is generated and then reduced by resolution conversion, thereby generating an image.

However, depending on contents, the text portion may contain important information, and for the remaining portions, only outlines may suffice. In this case, the text portion may be composited with the remaining portions at a double resolution without being reduced.

The preferred embodiments of the present invention have been described above. The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is achieved even by supplying software program codes for implementing the functions of the above-described embodiments to the system or apparatus through a storage medium (or recording medium) which stores the program codes and causing the computer (or a CPU or MPU) of the system or apparatus to execute the program codes. In this case, the program codes read out from the storage medium implement the functions of the above-described embodiments by themselves, and the program codes and a program product related to the program codes such as the storage medium which stores the program codes constitute the present invention. The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion card inserted into the computer or a function expansion unit connected to the computer, and the CPU of the function expansion card or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   storing means for storing encoded data obtained by executing predetermined sequence transformation and bit-plane-encoding for an input image;
   recognition means for recognizing a first image quality of the image to be displayed by a predetermined display device;
   output means for reading out, from said storing means, data necessary to reconstruct an image having a predetermined image quality in the encoded data and outputting the data;
   decoding means for decoding the output encoded data; and
   adjustment means for adjusting the image decoded by said decoding means to make an image quality of the image match the first image quality,
   wherein said recognition means instructs said output means to read out encoded data corresponding to a decoded image having a second image quality in the stored encoded data on the basis of a predetermined condition, and
   said adjustment means adjusts the image obtained by decoding, by said decoding means, the encoded data output by said output means, to make an image quality of the image to be displayed by said display device match the first image quality.

2. The apparatus according to claim 1, wherein said adjustment means adjusts an image output on the basis of a difference between the first image quality recognized by said recognition means and the second image quality obtained by said decoding means to make an image quality of the image match the first image quality.

3. The apparatus according to claim 1, wherein the first image quality is a resolution of the image to be displayed.

4. The apparatus according to claim 1, wherein the second image quality is a resolution 2×2 times that of the image to be displayed.

5. The apparatus according to claim 1, wherein the second image quality is a resolution not less than 2×2 times that of the image to be displayed.

6. The apparatus according to claim 1, wherein an image having a resolution equal to or higher than the resolution is an image having a resolution equal to or lower than a highest resolution displayable by the encoded data stored in said storing means.

7. The apparatus according to claim 1, wherein the encoded data output by said output means corresponds to all or some data of each bit plane generated by the bit-plane-encoding in the encoded data corresponding to the second image quality.

8. The apparatus according to claim 5, wherein the encoded data output by said output means corresponds to all or some data of each bit plane generated by the bit-plane-encoding in the encoded data corresponding to the second image quality.

9. The apparatus according to claim 6, wherein the encoded data output by said output means corresponds to all or some data of each bit plane generated by the bit-plane-encoding in the encoded data corresponding to the second image quality.

10. The apparatus according to claim 1, wherein the sequence transformation is discrete wavelet transformation.

11. The apparatus according to claim 1, wherein in decoding the encoded data corresponding to the second image quality, said decoding means stops decoding at a predetermined bit plane for encoded data which is not related to the first image quality.

12. The apparatus according to claim 1, wherein said decoding means receives encoded data obtained by segmenting the image to be encoded into at least one rectangular region and independently encoding the rectangular region and sequentially outputs a partial image corresponding to the rectangular region.

13. The apparatus according to claim 1, wherein the encoded data stored in said storing means is obtained by segmenting the received image into at least one rectangular region and independently encoding the rectangular region.

14. The apparatus according to claim 1, wherein said recognition means instructs said output means to output a code sequence related to the first image quality for a predetermined rectangular region in the code sequence independently encoded in units of rectangular regions and to output a code sequence related to the second image quality for remaining rectangular regions.

15. The apparatus according to claim 1, wherein said output means outputs a code sequence related to the first image quality for a predetermined rectangular region in the code sequence independently encoded in units of rectangular regions and outputs a code sequence related to the second image quality for remaining rectangular regions.

16. An image processing method comprising:

a storing step, of storing encoded data obtained by executing predetermined sequence transformation and bit-plane-encoding for an input image;

a recognition step, of recognizing a first image quality of the image to be displayed by a predetermined display device;

an output step, of reading out data necessary to reconstruct an image having a predetermined image quality in the encoded data and outputting the data;

a decoding step, of decoding the output encoded data; and an adjustment step, of adjusting the image decoded in said decoding step to make an image quality of the image match the first image quality, wherein said output step includes reading out encoded data corresponding to a decoded image having a second image quality in the stored encoded data on the basis of a predetermined condition, and said adjustment step includes adjusting the image obtained by decoding, in said decoding step, the encoded data output in said output step, to make an image quality of the image to be displayed by the display device match the first image quality.

17. A program wherein said program causes a computer to function as storing means for storing encoded data obtained by executing predetermined sequence transformation and bit-plane-encoding for an input image;

recognition means for recognizing a first image quality of the image to be displayed by a predetermined display device;

output means for reading out, from said storing means, data necessary to reconstruct an image having a predetermined image quality in the encoded data and outputting the data;

decoding means for decoding the output encoded data; and adjustment means for adjusting the image decoded by said decoding means to make an image quality of the image match the first image quality, wherein said recognition means instructs said output means to read out encoded data corresponding to a decoded image having a second image quality in the stored encoded data on the basis of a predetermined condition, and said adjustment means adjusts the image obtained by decoding, by said decoding means, the encoded data output by said output means, to make an image quality of the image to be displayed by said display device match the first image quality.

* * * * *

UNITED STATES PATENT AND TRADEMARK OFFICE
CERTIFICATE OF CORRECTION

PATENT NO. : 6,879,727 B2  
DATED : April 12, 2005  
INVENTOR(S) : Makoto Sato et al.

Page 1 of 1

It is certified that error appears in the above-identified patent and that said Letters Patent is hereby corrected as shown below:

<u>Title page,</u>
*Primary Examiner*, "Von J. Couso" should read -- Yon J. Couso --.

<u>Column 24,</u>
Line 51, "claim 1," should read -- claim 4, --.

Signed and Sealed this

Twenty-eighth Day of March, 2006

JON W. DUDAS
*Director of the United States Patent and Trademark Office*